US007930554B2

(12) United States Patent
Coulier et al.

(10) Patent No.: US 7,930,554 B2
(45) Date of Patent: Apr. 19, 2011

(54) REMOTE AUTHENTICATION AND TRANSACTION SIGNATURES

(75) Inventors: Frank Coulier, Grimbergen (BE); Frank Hoornaert, Wemmel (BE)

(73) Assignee: Vasco Data Security,Inc., Oak Brook Terrace, IL (US)

( * ) Notice: Subject to any disclaimer, the term of this patent is extended or adjusted under 35 U.S.C. 154(b) by 882 days.

(21) Appl. No.: 11/756,088

(22) Filed: May 31, 2007

(65) Prior Publication Data

US 2008/0301461 A1  Dec. 4, 2008

(51) Int. Cl.
H04L 29/06 (2006.01)
G06F 21/00 (2006.01)
(52) U.S. Cl. ............... 713/184; 713/182; 713/150
(58) Field of Classification Search .......... 713/184, 713/150, 182
See application file for complete search history.

(56) References Cited

U.S. PATENT DOCUMENTS

| 4,590,365 A | 5/1986 | Okada |
| 4,599,489 A | 7/1986 | Cargile |
| 4,609,777 A | 9/1986 | Cargile |
| 4,819,267 A | 4/1989 | Cargile et al. |
| 4,885,778 A | 12/1989 | Weiss |
| 5,412,726 A | 5/1995 | Nevoux et al. |
| 5,485,519 A | 1/1996 | Weiss |
| 5,521,966 A | 5/1996 | Friedes et al. |
| 5,613,159 A | 3/1997 | Colnot |
| 5,625,534 A | 4/1997 | Okaya et al. |
| 5,657,388 A | 8/1997 | Weiss |
| 5,802,176 A | 9/1998 | Audebert |
| 5,884,292 A | 3/1999 | Baker et al. |
| 5,889,941 A | 3/1999 | Tushie et al. |
| 5,915,209 A | 6/1999 | Lawrence |
| 5,937,068 A | 8/1999 | Audebert |
| 5,943,423 A | 8/1999 | Muftic |
| 5,988,510 A | 11/1999 | Tuttle et al. |
| 6,065,679 A | 5/2000 | Levie et al. |
| 6,129,274 A | 10/2000 | Suzuki |

(Continued)

FOREIGN PATENT DOCUMENTS

DE  198 41 886 A1  8/1999

(Continued)

OTHER PUBLICATIONS

Schneier (Risks of PKI: Electronic Commerce, year 2000).*

(Continued)

*Primary Examiner* — David Y Jung
(74) *Attorney, Agent, or Firm* — Manatt, Phelps and Phillips

(57) ABSTRACT

The invention provides a method, apparatus, computer readable medium and signal which allows the usage of devices containing PKI private keys such as PKI-enabled smart cards or USB sticks to authenticate users and to sign transactions. The authenticity of the user and/or the message is verified. Furthermore the operation (authentication and/or signing) occurs without the need for an application to have some kind of a direct or indirect digital connection with the device containing the private key. In other words a digital connection that would allow an application to submit data to the card for signing by the card's private key and that would allow retrieving the entire resulting signature from the card is not required. In addition the operation occurs without the need for the PKI-enabled device containing the private key (e.g. a PKI smart card or USB stick) to either support symmetric cryptographic operations or to have been personalized with some secret or confidential data element that can be read by a suitable reader.

58 Claims, 12 Drawing Sheets

U.S. PATENT DOCUMENTS

| | | | |
|---|---|---|---|
| 6,145,739 | A | 11/2000 | Bertina et al. |
| 6,196,459 | B1 | 3/2001 | Goman et al. |
| 6,234,389 | B1 | 5/2001 | Valliani et al. |
| 6,308,266 | B1 | 10/2001 | Freeman |
| 6,351,813 | B1 | 2/2002 | Mooney et al. |
| 6,393,563 | B1 | 5/2002 | Maruyama et al. |
| 6,484,260 | B1 | 11/2002 | Scott et al. |
| 6,550,683 | B1 | 4/2003 | Augustine |
| 6,564,995 | B1 | 5/2003 | Montgomery |
| 6,694,436 | B1 | 2/2004 | Audebert |
| 6,715,078 | B1 | 3/2004 | Chasko et al. |
| 7,519,989 | B2 | 4/2009 | Lin et al. |
| 2001/0054148 | A1 | 12/2001 | Hoornaert et al. |
| 2002/0087860 | A1 | 7/2002 | Kravitz |
| 2002/0175207 | A1 | 11/2002 | Kashef et al. |
| 2003/0065653 | A1 | 4/2003 | Overton et al. |
| 2005/0050330 | A1 | 3/2005 | Agam et al. |

FOREIGN PATENT DOCUMENTS

| | | | |
|---|---|---|---|
| EP | 1 211 841 | B1 | 6/2002 |
| WO | WO 98/16908 | A1 | 4/1998 |
| WO | WO 01/61620 | A1 | 8/2001 |
| WO | WO 2005/022288 | A2 | 3/2005 |

OTHER PUBLICATIONS

Authenticated public-key encryption based on elliptic curve; Yiliang Han; Xiaoyuan Yang; Yupu Hu; Embedded Software and Systems, 2005. Second International Conference on; Publication Year: 2005.*

Using the mobile phone as a security token for unified authentication; Hallsteinsen, S.; Jorstad, I.; Do Van Thanh; Systems and Networks Communications, 2007. ICSNC 2007. Second International Conference on; Publication Year: 2007 , pp. 68-68.*

Efficient memory integrity verification and encryption for secure processors; Suh, G.E.; Clarke, D.; Gasend, B.; van Dijk, M.; Devadas, S.; Microarchitecture, 2003. MICRO-36. Proceedings. 36th Annual IEEE/ACM International Symposium on; Publication Year: 2003 , pp. 339-350.*

Clear2Pay, "clear2pay's e-Security Pack (eSP) compliant with the Mastger Card OneSmart™ Chip Authentication Program", Brussels/Paris, 2 pgs. (Nov. 15, 2005).

"The Next Generation of eBanking", Retrieved: www.terideau.com, 1 pg. (Aug. 2006).

* cited by examiner

REMOTE AUTHENTICATION AND TRANSACTION SIGNATURES

BACKGROUND

As remote access of computer systems and applications grows in popularity the number and variety of transactions which are accessed remotely over public networks such as the Internet has increased dramatically. This popularity has underlined a need for security in particular;

a. How to insure that people who are remotely accessing an application are who they claim they are and how to insure the transactions being conducted remotely are initiated by legitimate individuals. This subject is referred to as authentication.
b. How to insure that transaction data has not been altered before being received at an application server. This is referred to as data integrity.
c. How to guarantee that an individual, once having engaged in a transaction, is not in a position to repudiate it. This is referred to as non-repudiation.

In the past, application providers have relied on static passwords to provide the security for remote applications. In the last couple of years it has become evident that static passwords are not sufficient and that more advanced security technology is required.

PKI Smart Cards

One way of solving the security problems associated with remote access to computer systems and applications over public networks is provided by a Public Key Infrastructure. In a Public Key Infrastructure one associates a public-private key pair with each user. The key pair is associated with a certificate (issued by a trusted Certificate Authority) that binds that public-private key pair to a specific user. By means of asymmetric cryptography this public-private key pair can be used to:
a. authenticate the user,
b. sign transactions, documents, e-mails (so as to prevent repudiation), and
c. set up encrypted communication channels.

To guarantee an adequate level of security it is mandatory that each user's private key remains secret and can only be accessed (e.g. to create a signature) by the legitimate user associated with that key. It is common to rely on a smart card to store the public-private key pair and the certificate and to carry out the cryptographic calculations involving the private key. The use of the private key by the card is then often PIN-protected.

PKI-enabled smart cards are, and have been issued by:
a. Corporations to their employees or customers to secure the log-in to their computer networks or the remote access to their applications,
b. Banks to their customers to secure e.g. Internet banking applications, and
c. Governments to their citizens as electronic ID cards to create legally binding electronic signatures.

Apart from the advantages, there are also some disadvantages associated with PKI and the smart cards carrying the PKI keys and certificates:
a. Building a Public Key Infrastructure is generally quite complicated and therefore expensive when compared to competing security technologies.
b. PKI is inherently limited to environments and applications where there is a digital connection between clients and servers. In other words it is unsuitable for telephone banking or other delivery channels where it is not possible to provide a digital connection between the container of the PKI certificate and private key on the one hand and an application server on the other hand.
c. PKI smart cards do not have a power supply or a user interface. PKI smart cards therefore rely on the presence of an interfacing device that provides electrical power to the card, that is capable of digitally exchanging data with the card, and that is capable of interfacing with the user (e.g. capturing the card's PIN and presenting the data that should be signed). In most cases a PC with a connected transparent smart card reader is used. This reduces the mobility of the user (many PCs are not equipped with smart card readers). It also presents a security problem: all user interaction (such as approving a signature or capturing the card's PIN) is done on the inherently insecure PC.

Strong Authentication Tokens

An alternative technology for authentication and transaction signature capabilities is offered by what are called 'strong authentication token devices'. A typical example of strong authentication token is any one of the Digipass tokens offered by Vasco Data Security Inc., see the website Vasco.com.

A strong authentication token is a small autonomous battery-powered device with its own display and keyboard. In some cases the keyboard is reduced to a single button or even completely omitted. The main purpose of a strong authentication token is to generate so-called 'One-Time Passwords' (OTPs). In some cases strong authentication tokens are also capable of generating electronic signatures or Message Authentication Codes (MACs) on data that has been entered on the token's keyboard. If the token has a keyboard, the usage of the token is often protected by a PIN. To be able to generate OTPs or MACs, strong authentication tokens are capable of doing cryptographic calculations based on symmetric cryptographic algorithms parameterized with a secret value or key. Typical examples of such symmetric cryptographic algorithms parameterized with a secret value or key are symmetric encryption/decryption algorithms (such as 3DES or AES) and/or keyed one-way hash functions (such as MD5 or SHA-1 in OATH compliant tokens). In the remainder of the text the output of such algorithms will sometimes be referred to as 'symmetric cryptogram'. The terminology 'symmetric cryptogram' shall thus be understood as not only the output of a symmetric encryption algorithm but also of symmetric decryption algorithms or keyed hash functions. Strong authentication tokens are personalized with one or more secret keys that are supposed to be different for each individual token. To generate a one-time password or signature, the token typically performs the following steps (refer to FIG. 1):
a. Step 10: The token takes some input value (this could be a challenge generated by a server and typed-in on the keyboard by the user, and/or the value of the token's internal real-time clock, and/or the value of an internal counter managed by the token, and/or transaction data typed-in on the keyboard by the user).
b. Step 11: The token puts the input value into a specified format.
c. Step 12: The token then submits this formatted input to a symmetric encryption/decryption algorithm and/or one-way hash function parameterized by a personalized secret key 15 stored securely in the token. The result is a cryptogram or a hash value.
d. Step 13: The token transforms the cryptogram or hash value that is the outcome of this encryption/decryption or one-way hash into the actual OTP or MAC. i.e., the cryptogram or hash is typically truncated, converted in a human readable format (e.g. through decimalization) and visualized on the display. The user may submit this value to the application server.

In most cases a strong authentication token is a physical device, however in some cases the functionality of these strong authentication tokens to generate OTPs or MAC signatures is emulated by software running on a PC, a workstation, a mobile phone, a personal organizer, a PDA, etc. The latter are referred to as "soft tokens".

Once the OTP or MAC has been produced it is conveyed to an entity where the value can be verified as authenticating the user or the message, see FIG. 2. Typically the entity is an application server. The application server stores data for each token, including which secret key(s) the token has been personalized with, and the identity of the user associated with the token. To validate a one-time password or signature, the server retrieves the secret key (115) which is a copy of the key personalized in the token, takes the same inputs that were used by the token and in essence performs the same algorithm 112 as the token. The server then compares 120 the result it obtained with the value it received. (In practice, the validation of an OTP or MAC is often somewhat more convoluted if the strong authentication algorithm is time-based or counter-based, due to synchronization issues.) Since a one-time password or signature generated by a strong authentication token is a function of the token's individual secret key and the always different values of the input(s) to the token algorithm, validating the correctness of the one-time password or signature gives the application server a very high degree of confidence that the person submitting the one-time password or signature possesses the correct token and knows its PIN (if the token is PIN protected), which in turn gives a high degree of confidence that that person is indeed the legitimate user associated with that token device.

Because the OTP verification server and the OTP token in essence perform the same algorithm with the same key, the OTP generation algorithm can be a one-way or non-reversible function. That means that the actual OTP can be shorter than the cryptogram or hash value from which it is derived. This allows for OTP or MAC lengths that are sufficiently short so that it is not too inconvenient for users to manually copy the OTP or MAC values from the token display onto a PC. As a consequence strong authentication tokens don't require a digital connection between the token and the verification server.

The major advantages of strong authentication tokens when compared to PKI cards are:
a. They are fully autonomous (tokens have their own power supply and their own user interface);
b. They are independent of the delivery channel or communication medium (tokens don't require any digital or electronic connection with any other device; all input and output of data is done by the user via the token's display and keyboard); and
c. They offer a very high level of security (all user interaction such as capturing the PIN or providing transaction data to be signed is done via the token's own secure user interface).

In some cases where smart cards have been issued, one wants to get around the disadvantages and limitations associated with smart cards and achieve the same advantages that strong authentication tokens offer i.e. full autonomy, independence of the delivery channel, and a secure user interface.

One alternative is to combine the smart card with an unconnected, battery-powered smart card reader that has its own display and keyboard. The idea is that the combination of the smart card and the unconnected smart card reader emulates a strong authentication token. The functionality normally provided by a strong authentication token is then split over the smart card and the unconnected reader. The unconnected reader takes care of all user interface, and all or a part of the other token functionality is delegated to the card.

Typically, all personalized secrets and security sensitive data are stored and managed by the card (e.g. the PIN is stored and verified by the card, the secret keys are stored on the card and all cryptographic operations involving those keys are done by the card, counters used as input for the token algorithm are stored and managed by the card). Part of the token functionality that is less sensitive (e.g. truncating and converting the generated hashes or cryptograms) often happens in the reader. An example of this combination is discussed below.

This principle is often used by banks that combine the bank cards they issue (for usage at Automatic Teller Machines or Point Of Sale terminals) with unconnected readers to secure their remote banking applications (such as internet banking or telephone banking). A good example of this is the Mastercard Chip Authentication Programme (CAP), which specifies how EMV smart cards can be used in combination with unconnected smart card readers to generate one-time passwords and electronic transaction data signatures.

This technology relies on the smart cards being capable of doing symmetric cryptographic operations and having been personalized with a secret key to be used for symmetric cryptographic operations. However, PKI-enabled smart cards are designed to store asymmetric keys and do asymmetric cryptographic operations. Many PKI-enabled smart cards don't support symmetric cryptographic operations or (if they do) have never been personalized with an individual symmetric secret key.

Traditional PKI Signatures

The usual way to create an electronic signature with a PKI smart card, is that the input data (usually, the input data consist of a hash of the actual transaction data one wants to sign) are encrypted by the card's private key.

The usual way to validate such a signature, is that the validating entity decrypts the received signature with the public key. If the decryption of the signature results in the same value as the input data that were supposed to have been encrypted by the private key, the signature is validated successfully. Note that thanks to this asymmetric characteristic the validating entity never needs to have access to the card's private key. This allows the private key to be kept secret from any party other than the signing party, even from any verifying party, thus providing for true non-repudiation.

This can only be done successfully if the signature itself is in its entirety available to the validating entity. The decryption of an incomplete signature would only result in meaningless data that can not be compared with the input data that were supposed to have been signed.

This condition can not be fulfilled in practice when small hand-held unconnected smart card readers are being used: given that a typical PKI signature size is in the order of 100 bytes, the display of these readers is far too small to display a full signature and it is in any case totally unrealistic to expect a user to manually transfer a 100-byte value from the reader's display to a PC without making a single mistake. The 100-byte typical PKI signature should be compared to a typical 6 to 8-digit or 3 to 4-byte OTP or MAC of a traditional strong authentication token. This is certainly a reason why asymmetric cryptography and private keys have not been used to generate OTPs and MACs by e.g. strong authentication tokens.

What is desired is a method and apparatus that:
a) allows the usage of a device storing PKI private keys (such as PKI-enabled smart cards or USB sticks) to authenticate users and to sign transactions,
b) without the need for any user application to have some kind of a direct or indirect digital connection with the device containing the private key, in particular a digital connection that would allow the user application to submit data to the card for signing by the card's private key and that would allow retrieval of the entire resulting signature from the card should not be necessary,
c) without the need for the PKI-enabled device containing the private key (e.g. a PKI smart card or USB stick) to:
1) either support symmetric cryptographic operations, or
2) to have been personalized with some secret or confidential data element that can be read by a suitable reader.

SUMMARY OF THE INVENTION

This application provides a description of a method and apparatus which meets the foregoing desire. In particular this application describes a number of embodiments which use the private key of a public-private key pair (a key which is meant to be used for asymmetric cryptography such as for example the RSA algorithm) to authenticate a user (via generation of a OTP) or to sign data (via generation of a MAC).

The embodiments described here differ from the traditional use of private keys to authenticate users and sign data (as described above) in that:
a) the same cryptographic key is used to generate and verify the OTPs and MACs; and
b) the length in bits of the OTP and MAC values can safely be considerably less than the length in bits of the cryptograms generated by the private keys.

All embodiments have in common that:
a) They all calculate a dynamic value using one or more variable inputs by means of a cryptographic algorithm that uses a secret that is also known or accessible to a verifying server.
b) These variable inputs can be any of:
1) Time value, or
2) Counter value, or
3) Challenge value, or
4) Transaction Data, or
5) Any combination of the above.
c) The dynamic value is then transformed into an OTP or MAC.
d) At some point in the course of developing the OTP or MAC an asymmetric cryptographic operation with a private key (i.e. an encryption/decryption or a signature) is carried out.
e) The transformation of the dynamic value into an OTP or MAC is such that the length or size of the OTP or MAC is smaller than the size of the cryptogram that was generated by the asymmetric cryptographic operation with the private key.

The precise role of the asymmetric cryptographic operation with the private key in the overall process of generating the OTP or MAC can be different from one embodiment to another.

In some embodiments the asymmetric cryptographic operation with the private key is performed each time an OTP or MAC has to be generated. In other embodiments more than one OTP or MAC can be generated in connection with a single asymmetric cryptographic operation with the private key. In the latter case, criteria that can determine whether or not a new asymmetric cryptographic operation with the private key is required when a new OTP or MAC needs to be generated can include:
a) The time that has passed since the last asymmetric cryptographic operation.
b) The number of OTPs and/or MACs that have already been generated.
c) Whether or not a communication session between a device containing the private key and a device capturing the inputs and making available the OTPs has been uninterrupted (e.g. whether a PKI smart card has not been removed from a smart card reader).
d) The type of OTP or MAC. For example the generation of a MAC might always require a new asymmetric cryptographic operation but the generation of an OTP would not.

In a typical embodiment only one private key is used and only one asymmetric cryptographic operation is performed with that private key. However, some embodiments may perform a number of cryptographic operations with either a single private key or with a number of private keys. Examples:
a) If the OTP is a function of the encryption result of the variable inputs by a private key, then a variant could be that the OTP is a function of more than one cryptogram, or that the variable inputs are encrypted by more than one private key to generate the OTP.
b) If the generation of an OTP only takes place after the presence of a specific smart card is verified by checking the result of an encryption of a challenge by the card's private key, then a variant could be that more than one challenge is submitted to the card to be encrypted by the card's private key.
c) In many cases a PKI card contains a so-called utility private key and a signature private key. In that case the utility key might be used if an OTP is generated and the signature key might be used if a MAC is generated.

In a preferred embodiment both OTPs to authenticate a user and MACs to sign data can be generated. However alternative embodiments can be limited to only being capable of generating OTPs or only being capable of generating MAC signatures.

In a typical embodiment the asymmetric cryptographic algorithm used with the private key will be the RSA algorithm. However, other embodiments can use other asymmetric algorithms provided they are capable of either encryption or decryption or signing functionality by using the private key. Examples of such algorithms include: RSA, knapsack algorithms such as Merkle-Hellman or Chor-Rivest, Pohlig-Hellman, Diffie-Hellman, ElGamal, Schnorr, Rabin, Elliptic Curve cryptosystems, Finite Automaton public key cryptosytems, the Digital Signature Algorithm (DSA, DSS).

In a typical embodiment the component that contains the private key and the component that generates the OTP and MAC values are two different components, each being a part of two different devices. However, embodiments can easily be conceived in which these two components are parts of the same device or are even the same component.

In a typical embodiment the private key is stored on a smart card. In a preferred embodiment the cryptographic calculations involving the private key are performed by that smart card. In a typical embodiment the OTP and/or MAC values are generated by a device that is equipped with or connected to a component or device that can communicate with the smart card containing the private key.

In a preferred embodiment the card reading device is an unconnected smart card reader with its own power supply and running the appropriate software to communicate with a PKI smart card which has been inserted into the smart card reader to generate OTPs or MACs.

In another embodiment the card reading device is the combination of some computing device such as a PC, PDA, cell phone, etc., equipped with a smart card reader and running the appropriate software to generate OTPs or MACs.

In a typical embodiment the physical, electrical and protocol aspects of the communication between the smart card and the smart card reading device is the same or similar to those described in the ISO 7816 standard. Other embodiments could use other communication means such as a contactless smart cards as described in ISO 14443.

Alternative form factors are available for the private key containing device, as well as alternative form factors for the OTP or MAC generating device, and alternative means for the communication between the private key containing component or device on the one hand and the OTP and MAC generating component or device on the other hand. These alternatives are within the scope of the invention as described herein.

In one embodiment the OTPs or MACs values are visualized on a display of the card reading device. An OTP can e.g. consist of a series of symbols. In a typical embodiment these symbols are decimal digits. In other embodiments these symbols can for example include:
  a) hexadecimal digits, or
  b) base 64 digits, or
  c) characters from a writing system such as an alphabet, or
  d) pictograms.

In one embodiment the generated OTPs or MACs are communicated to the user by means of audible signals. For example the OTP can be a string of digits or characters or words that each have a characteristic associated tone or that are read by a text-to-speech converter.

In one embodiment the generated OTPs or MACs are directly communicated to an application by some electronic wired or wireless communication mechanism. This mechanism can include a USB connection or an infrared connection or a Near Field Communication connection or an RF connection or a Bluetooth connection.

Other output mechanisms for the OTPs or MACs can be provided. In some embodiments the private key-based function is PIN protected.

The following description describes the basic embodiments in more detail. In some embodiments the card's private key-based function is directly or indirectly used in the OTP or MAC generation. Either
  a. an asymmetric cryptographic operation involving the card's private key is an integral phase or part of the transformation of the variable inputs into an OTP or MAC (Using the asymmetric algorithm in a symmetric way), or
  b. the card's private key-based function is used more indirectly to provide a seed value that is used to derive a secret symmetric key that is used by the OTP or MAC generation algorithm. (Using an asymmetric cryptogram as a seed to derive a secret key).

In some of the embodiments the value of the OTPs and/or MACs is a function of the actual value of the card's private key. In yet other embodiments the card's private key-based function is used to unlock the OTP or MAC generation algorithm in the reader:
  a. Either the card is linked to an already personalized reader and recognized on the basis of stored challenge-response pair(s), or
  b. the card is authenticated by the reader through traditional PKI certificate based verification.

In the embodiments described in the immediately preceding paragraph the value of the generated OTPs and/or MACs is not a function of the actual value of the card's private key.

Thus in one aspect the invention provides a method to generate a security value comprising a One-Time Password (OTP) or a Message Authentication Code signature (MAC) comprising:
  obtaining an intermediate dynamic value created using one or more variable inputs and a cryptographic algorithm employing at least one secret;
  transforming said dynamic value into said security value, wherein an asymmetric cryptographic operation with a private key is carried out producing a cryptogram, in order to transform said dynamic value, and
  said transforming includes producing said security value of a size which is smaller than the size of a cryptogram that was generated by said asymmetric cryptographic operation.

In another aspect the invention provides a device generating a security value comprising a One-Time Password (OTP) or a Message Authentication Code signature (MAC) using the method described immediately above.

In another aspect the invention provides a method of validating a security value provided by a user in order to authenticate the user or data associated with the user, said security value comprising a One Time Password or a signature comprising a Message Authentication Code; said method comprising:
  creating a reference cryptogram using a reference cryptographic algorithm applied to one or more reference inputs using a server key related to a PKI private key of an authentic user, the reference cryptographic algorithm and the one or more reference inputs selected as identical to corresponding elements used in creating the security value by the authentic user;
  thereafter either
  operating on said reference cryptogram alone by transforming said reference cryptogram into a reference security value including producing said reference security value of a size which is smaller than the size of the reference cryptogram and effecting a comparison of said reference security value and said security value, or
  operating on both said reference cryptogram and said security value to produce a modified reference cryptogram and a modified security value, said operation on said reference cryptogram identical, in part to an operation carried out to create said security value, and effecting a comparison of said modified reference cryptogram and said modified security value, and
  determining validity of said security value from results of said comparison.

In still another aspect the invention comprises a computer readable medium supporting a sequence of instructions which, when executed perform a method of generating a security value comprising a One-Time Password (OTP) or a Message Authentication Code signature (MAC), said method comprising:
  obtaining an intermediate dynamic value created using one or more variable inputs and a cryptographic algorithm employing at least one secret;
  transforming said dynamic value into said security value, wherein an asymmetric cryptographic operation with a private key is carried out producing a cryptogram, in order to transform said dynamic value, and said transforming includes producing said security value of a size which is smaller than the size of a cryptogram that was generated by said asymmetric cryptographic operation.

Finally in still another aspect the invention comprises an information bearing signal comprising a sequence of instructions which, when executed in a processor perform a method of generating a security value comprising a One-Time Password (OTP) or a Message Authentication Code signature (MAC), said method comprising:

obtaining an intermediate dynamic value created using one or more variable inputs and a cryptographic algorithm employing at least one secret;

transforming said dynamic value into said security value, wherein an asymmetric cryptographic operation with a private key is carried out producing a cryptogram, in order to transform said dynamic value, and said transforming includes producing said security value of a size which is smaller than the size of a cryptogram that was generated by said asymmetric cryptographic operation.

BRIEF DESCRIPTION OF THE DRAWINGS

Several embodiments of the invention are now further described in the following portions of the specification when taken in conjunction with the attached drawings in which.

DETAILED DESCRIPTION

Figure 12:
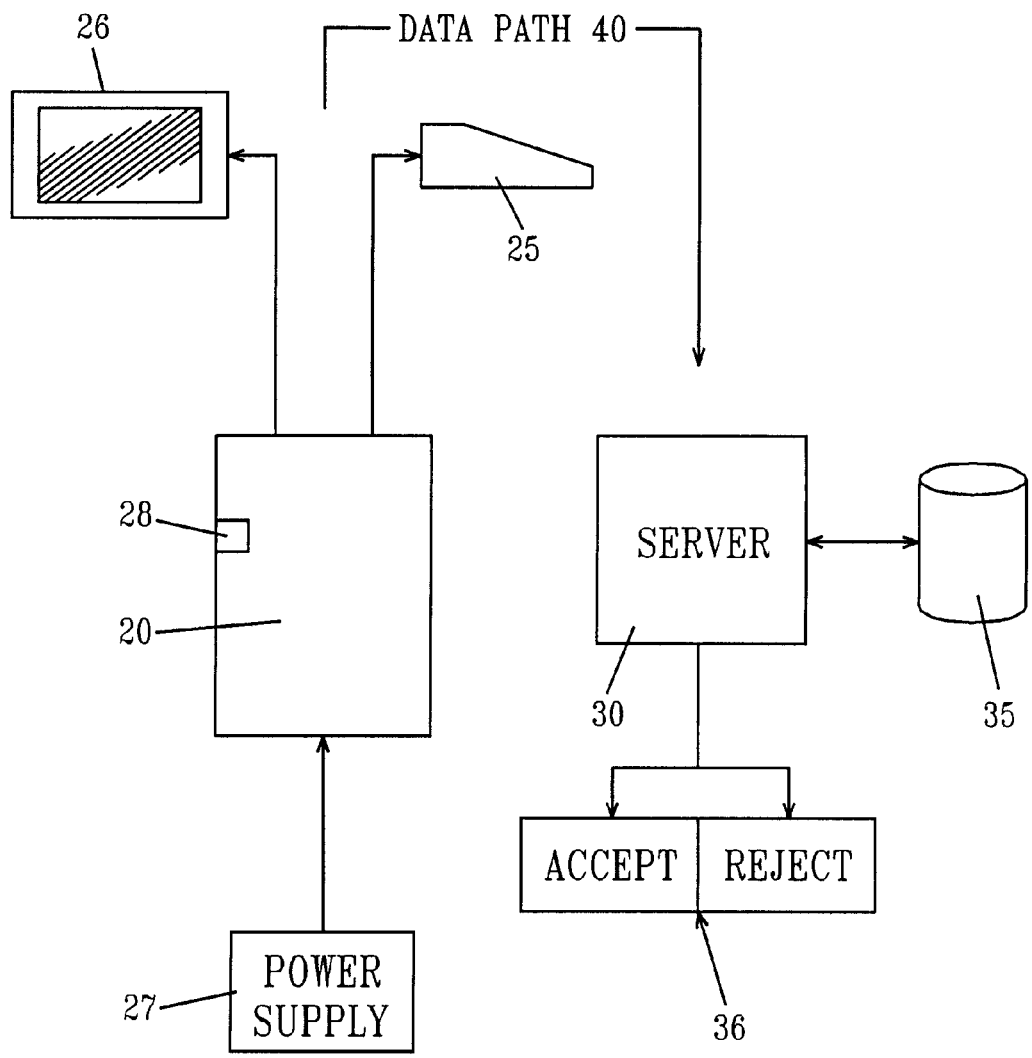
FIG. 12 illustrates the context in which embodiments of the invention operate.

Important components of embodiments of the invention are illustrated in FIG. 12 as including a smart card reader 20 (or simply reader) and an authentication server 30 (or simply server).

At a minimum the reader 20 includes an interface 28 to accept a smart card and a power supply 27. Some readers also include one or more user operable buttons or keys; this is represented in FIG. 12 by the keyboard 25. As used herein a user inserts a smart card into the smart card interface 28. As a consequence of some operation carried out by the reader 20, information is generated by the reader. That information may be a One-Time Password (OTP). If transaction data is input to the reader the information which is generated may include a signature such as a MAC. The output information may be presented on a display, such as the display 26. Alternatively the reader may be digitally connected to a network. In that event the information may be presented to another entity also connected to the network and the display 26 may be unnecessary. Typically the information which is generated by the reader 20 is used to authenticate a person or a message. A person may be authenticated by use of a smart card (proving possession of the card) and some other information (such as a PIN or other user data). The reader accepts the smart card and other information and creates an OTP. The OTP is communicated to server 30. Alternatively the message is signed by the reader 20, producing a MAC and the MAC is communicated to server 30.

Server 30 is typically implemented as a computer with processing capability and a data base 35. The information generated by the reader is communicated to the server 30 via the data path 40. Data path 40 may take various forms. Typically the user manually transfers information from the display 26 to a client device that is connected to the server 30. Alternatively data path 40 may comprise a digital path allowing information to be communicated from reader 20 to server 30. As another alternative the data path may carry audio information, such as a telephone circuit which carries the voice of a user enunciating information presented to the user on the display 26; where the information may be an OTP or MAC. Data path 40 may carry optical signals representing the information generated at reader 20. In general data path 40 is any path which can be used to communicate information from the reader 20 to the server 30. The server 30 accepts either the OTP or MAC and with the assistance of data in the data base 35 determines whether to accept or reject the information as validating the identity of the user (OTP) or the authenticity of the message (MAC). The particular procedures and data which are used by the server 30 are more particularly described below. One output of the server 30 selects either the accept or reject for status 36, reflecting either acceptance of the OTP as validating the authenticity of the user's claim of identity or the validation of the MAC as authenticating the associated message.

Using the Asymmetric Algorithm in a Symmetric Way

In this embodiment (see FIG. 3) a smart card 100 cooperates with a smart card reader 105. Smart card 100 stores a PKI private key 301 which is used in an asymmetric cryptographic operation. The card's private key-based function (i.e. an asymmetric cryptographic operation involving the card's private key such as signing or decrypting) is an integral phase or part of the process which produces the OTP or MAC.

Generation of the OTPs and/or MACs happens in the following way:
  Step 99: Input values which will be used in later steps are captured.
  Step 101: the input(s) for the OTP or MAC generation algorithm are transformed or formatted into an initial value.
  Step 102: the initial value is signed or encrypted/decrypted by the card's private key 301.
  Step 103: the resulting cryptogram is transformed into an OTP or MAC.

Figure 1:
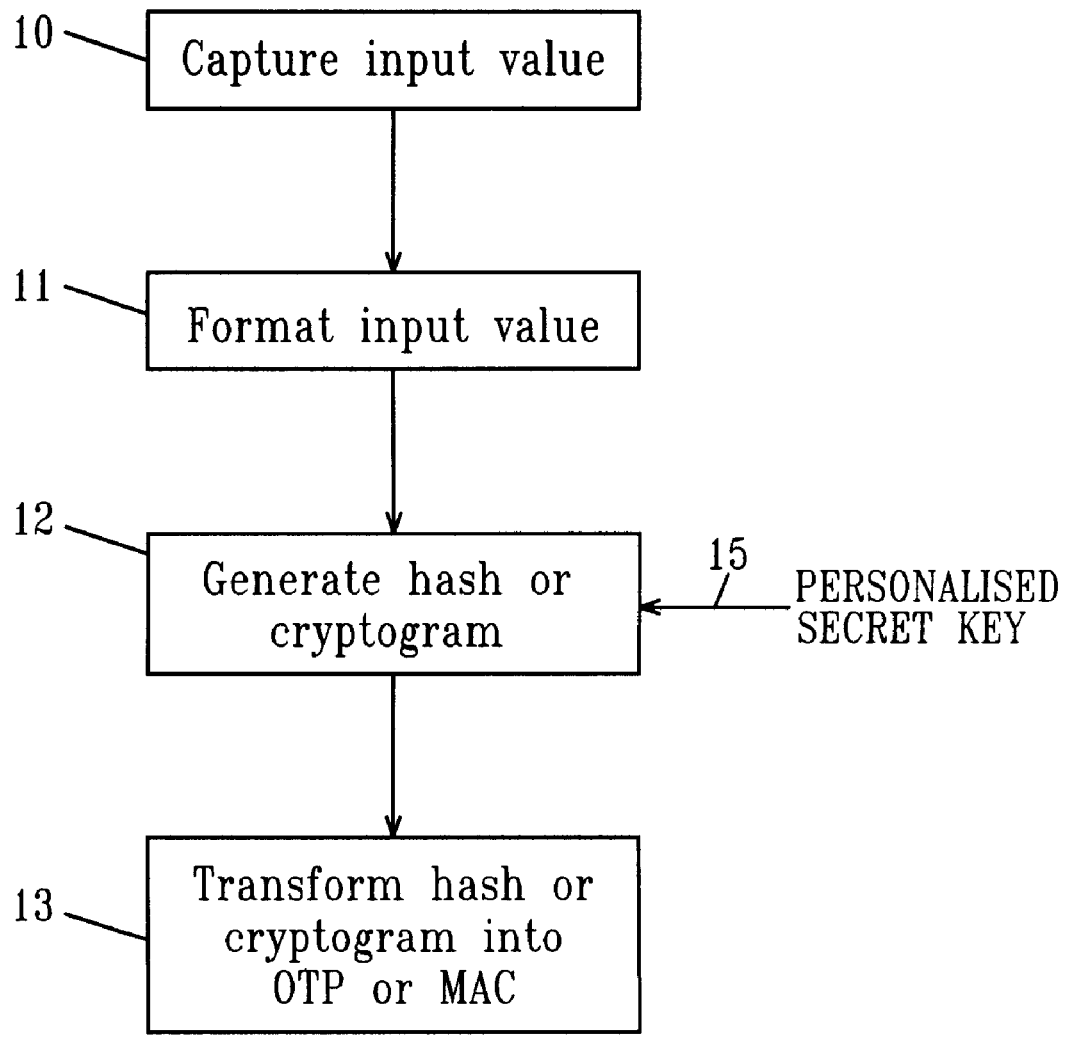
FIG. 1 is a flow diagram of the operation of a prior art strong authentication token in generating an OTP or MAC.
Figure 2:
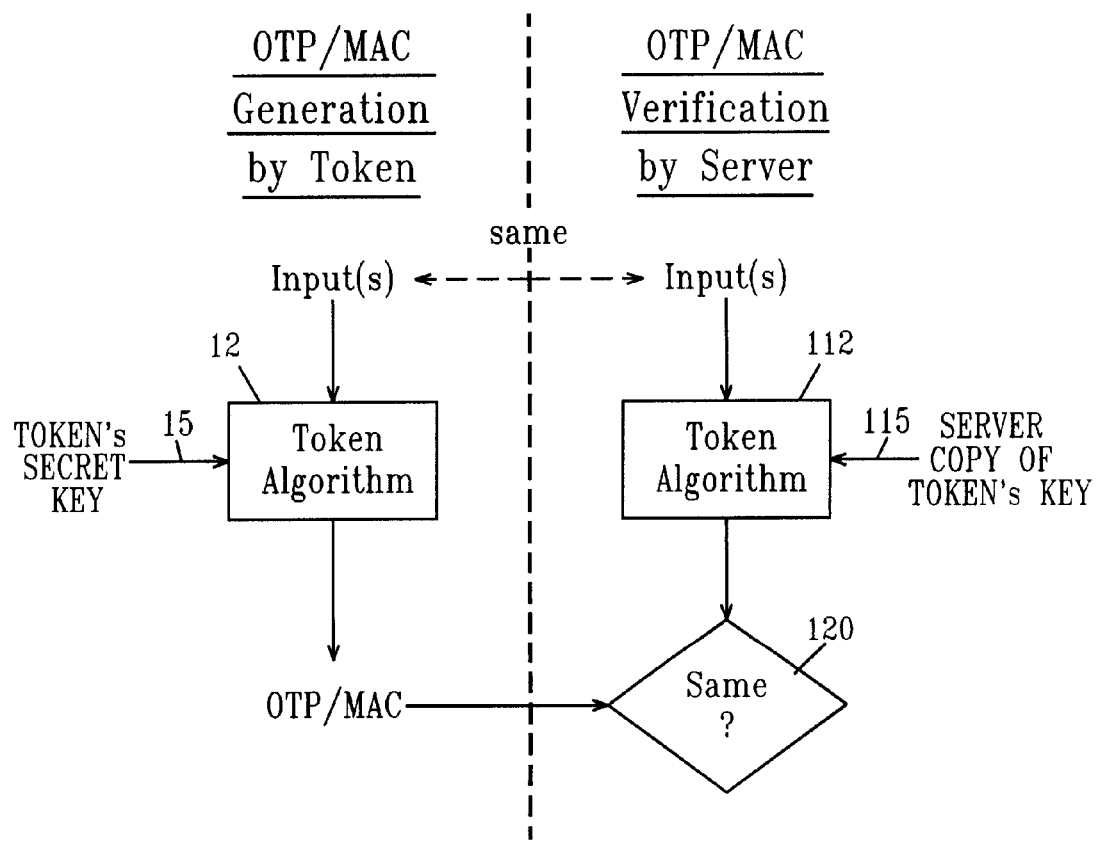
FIG. 2 is a flow diagram of the operation of a prior art server in authenticating an OTP or MAC generated by a strong authentication token and its relation to the OTP or MAC generation.
Figure 3:
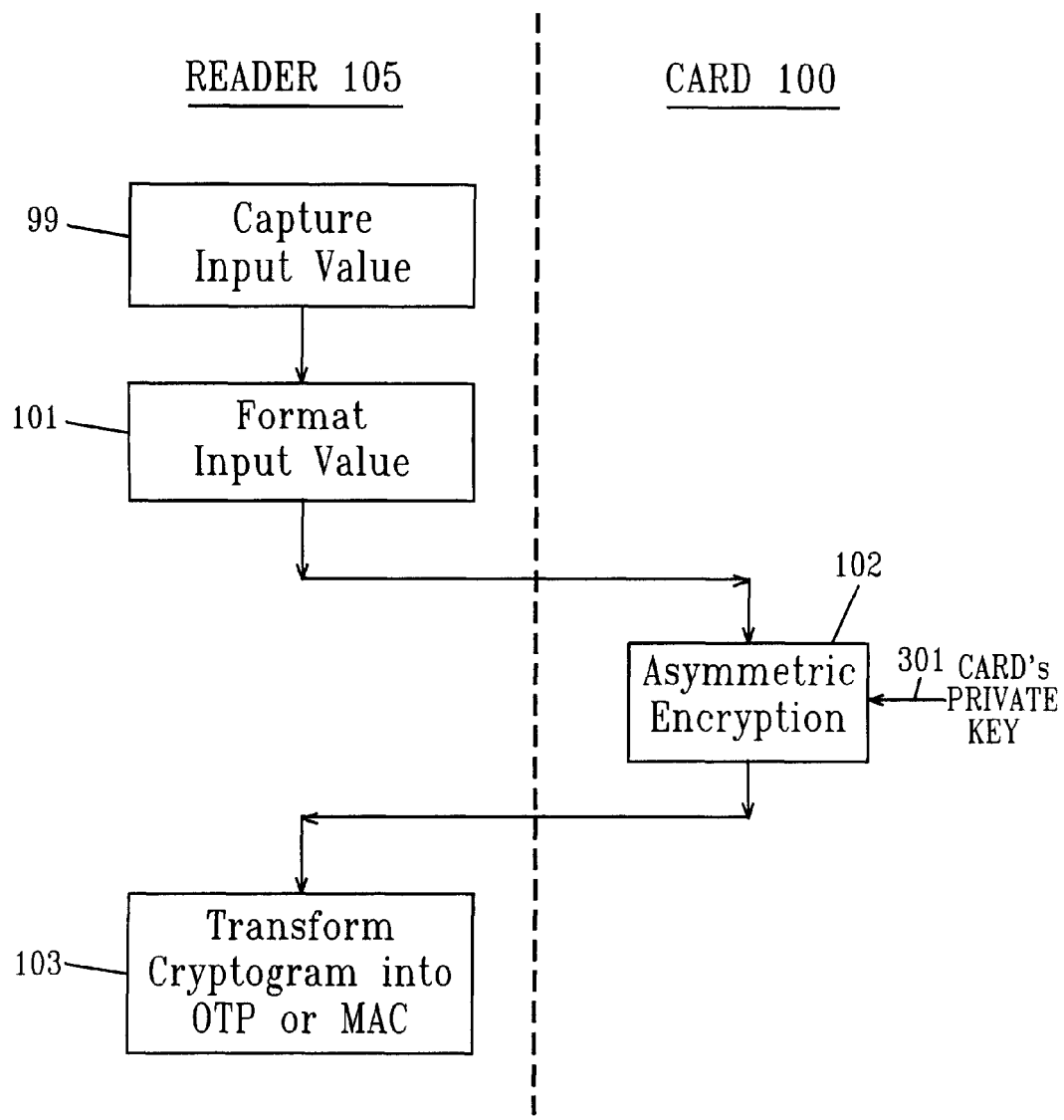
FIG. 3 is a flow diagram of an embodiment of the invention relying on an asymmetric cryptographic operation using a PKI private key to create a cryptogram from which an OTP or MAC is generated.

In the example of FIG. 3 the OTP or MAC is a function only of the result of the asymmetric cryptographic operation. However, in other embodiments the OTP or MAC may also be function of other data elements including values that are functions of the variable inputs but that are not functions of the private key 301.

In a typical embodiment the input(s) to the OTP or MAC generation algorithm are the same or similar as the inputs for the strong authentication algorithm(s) used in traditional strong authentication tokens. In other words these inputs may be selected as a:
  time value, or
  challenge (typically provided by a server), or
  counter value, or
  transaction data, or
  any combination of the above.

In some embodiments additional input(s) or parameter(s) to the OTP/MAC generation algorithm can include:
  data identifying a device (e.g. a reader serial number), or
  secrets stored in the device, or
  user identification data, or
  secret codes or secret values provided by the user.

Formatting these input(s) into the initial value, step 101 can include operations such as:
  Concatenation, or
  Hashing, or
  encryption/decryption with a symmetric cryptographic algorithm (e.g. using a secret key stored in the device or provided by the user).

Transforming the resulting cryptogram into the final OTP or MAC value, step 103 can include the following operations:
  hashing (possibly a keyed hashing using a secret key stored in the reader 105 or provided by the user), or
  encryption/decryption with a symmetric cryptographic algorithm (e.g. using a secret key stored in the reader 105 or provided by the user), or
  truncation, or
  selection of certain bits, nibbles or bytes, or
  decimalization. The latter may be accomplished by:
    interpreting the string of bits to be decimalized as a large binary representation of a number, or
    dividing the string of bits to be decimalized in groups of bits and mapping each group of bits onto a decimal digit. A typical example is dividing the string of bits into nibbles and mapping each nibble onto a decimal digit according to the following rule. If the hexadecimal value of the nibble is 0x0 to 0x9, take the decimal digit with the same value;
    if the hexadecimal value of the nibble is 0xA to 0xF, subtract a constant (between 0x6 and 0xA) and then take the decimal digit with the same value as the result of the subtraction, or
    many other decimalization algorithms known to those skilled in the art.

Figure 4:
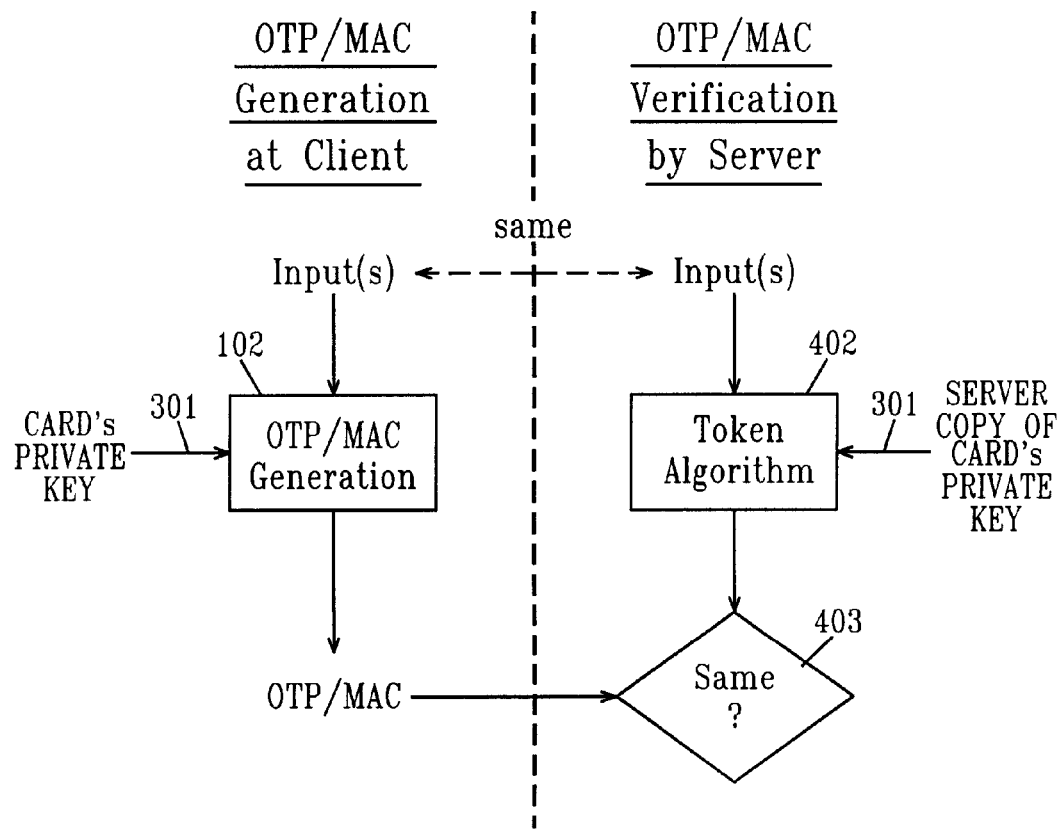
FIG. 4 is a flow diagram of an embodiment of the invention showing OTP/MAC generation at the client (as in FIG. 3, for example) and the related authentication at a server.

The validation phase is now described. In this embodiment the validating server has a copy of the private key 301 that was used to generate the OTP or MAC value and uses it to perform essentially the same algorithm as the algorithm to generate the OTP or MAC value. The validating server:
  (refer to FIG. 4) somehow obtains or reconstructs or guesses the value(s) of the data elements that were used as input(s) to the OTP or MAC generation algorithm when the OTP or MAC was generated:
    in case of a time value, the validating server may have its own clock that is synchronized with the clock used for generating the OTP or MAC,
    in case of a challenge, the challenge may have been generated by the validating server itself or may have been passed to the validating server by the application together with the received OTP or MAC,
    in case of a counter, the validating server may maintain its own counter value synchronized with the counter value used for generating the OTP or MAC,
    in case of transaction data, these data may have been passed to the validating server by the application together with the received OTP or MAC;
  the input(s) for the OTP or MAC generation algorithm are transformed into an initial value.

The initial value is thereafter signed or encrypted/decrypted (402) using the copy of the private key 301 held by the validation server. The validating server then compares (403) the resulting reference cryptogram with the OTP or MAC value that was received. If the resulting reference cryptogram matches the OTP or MAC value that was received, the signature is validated successfully. This comparison might be done in a number of ways:
  the validation server might in some embodiments transform the reference cryptogram into a reference OTP or MAC value and compare the reference OTP or MAC value with the received OTP or MAC value (e.g. by checking whether they are identical), or
  the validation server might reconstruct, from the received OTP or MAC value a part of the original cryptogram generated by the private key, and compare this partial cryptogram with the corresponding part(s) of the reference cryptogram,
  or
  the validation server might transform the reference cryptogram into a first intermediate validation value, and transform the received OTP or MAC into a second intermediate validation value, and compare the first and second intermediate validation values.

Figure 14:
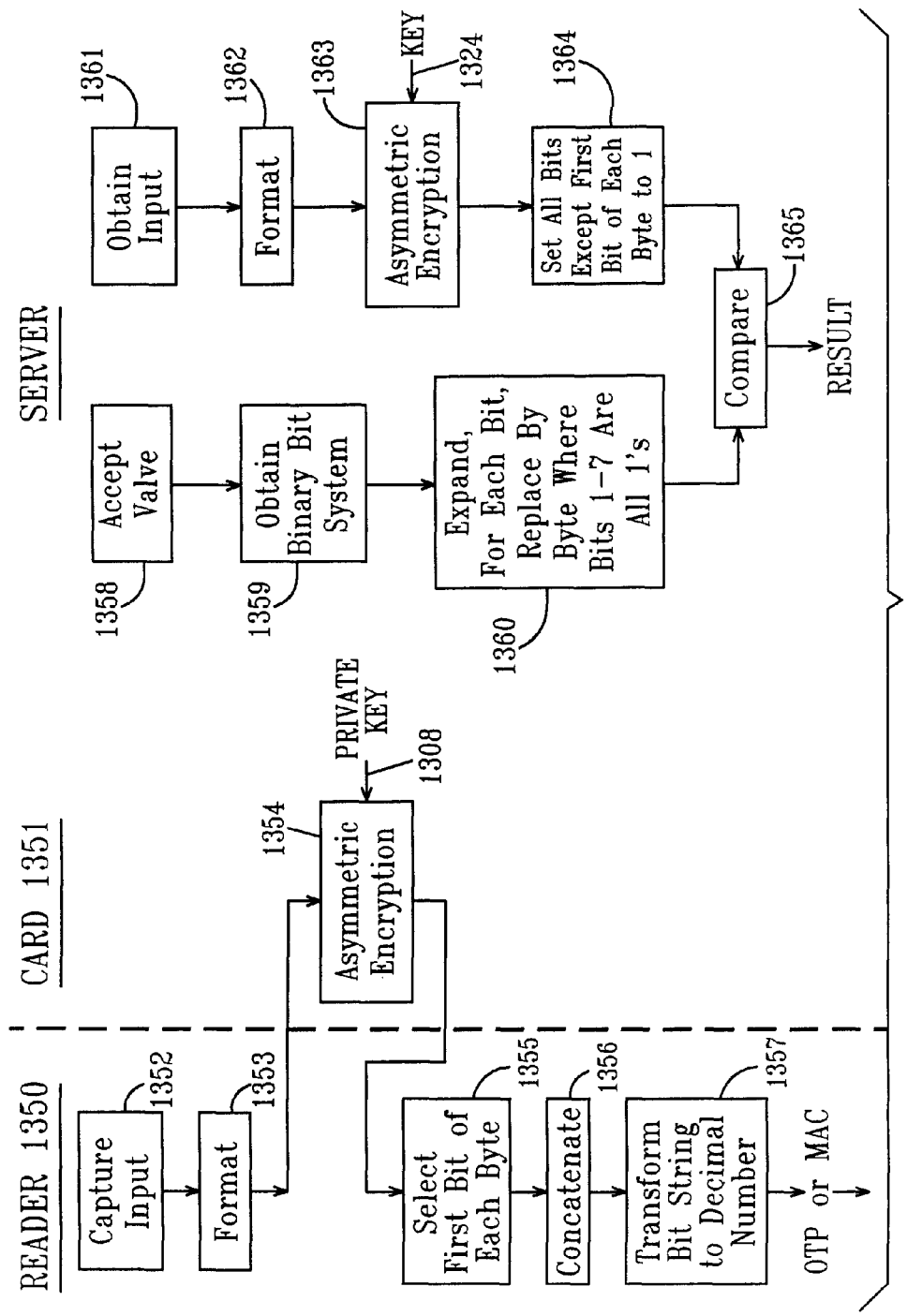
FIG. 14 is an illustration of another validation procedure.

This can be illustrated by the following example (see FIG. 14). In this example the OTP or MAC is produced based on a cryptogram which is the result of an asymmetric encryption using a private key 1308. The server produces a reference cryptogram which is also the result of an asymmetric encryption using a key 1324 which is a copy of the private key 1308. As shown in FIG. 14
  the reader 1350 calculates the OTP or MAC from said original cryptogram by:
    selecting every first bit of every byte of said resulting cryptogram (1355), and
    concatenating said selected bits into a bit string (1356), and
    interpreting said bit string as the binary interpretation of a number and obtaining the OTP or MAC by taking the decimal representation of said number (1357)
  the validation server validates this OTP or MAC as follows:
    the server modifies the reference cryptogram by setting all bits except every first bit of every byte to 1 (1364), and the server interprets the received OTP or MAC as the decimal representation of a number and obtains a bit string by taking the binary representation of that number (1359), and the server expands said bit string by replacing every bit of said bit string by a byte that consists of the bit being expanded appended with seven 1-bits (1360), and, the server compares said expanded bit string with said modified reference cryptogram (1365).

The parameters of this procedure (choosing one bit of every byte) is illustrative. Those skilled in the art will be able to select an appropriate parameter to suit their needs and context. In particular, a typical RSA cryptogram is about 100 bytes. Selecting one bit of each byte will produce 100 bits. At about 3 bits per decimal digit this will produce about 30 decimal digits for the OTP or MAC which is more practical than 300 decimal digits, but may still be considered awkward. In that event we can select one bit of every 40 bits for a total of 20 bits or about 6 decimal digits. The same procedure for generating the OTP or MAC from a cryptogram (transforming by selecting some but not all bits of the cryptogram) can also be used in the event a symmetric key is used in lieu of the asymmetric key. A typical symmetric cryptogram includes about 100 bits. In this case selecting one of every eight bits will leave us with about 12 bits or 4 decimal digits. This may be considered too small a number to be safe from attack. To avoid this problem we merely use one of every 4 bits (instead of 1 of every 8) to leave us with about 25 bits or about 8 decimal digits.

Figure 13:
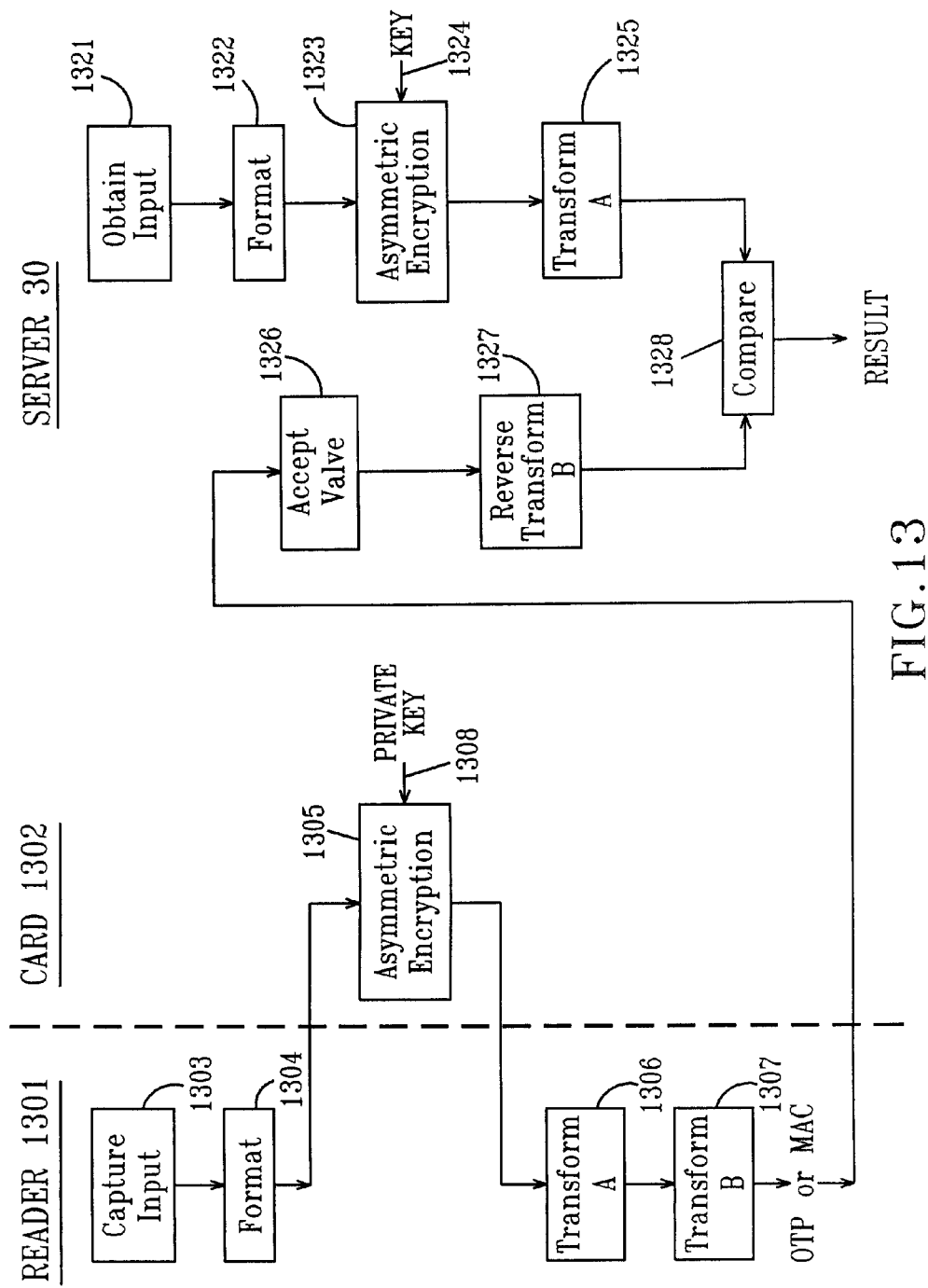
FIG. 13 is an illustration of a first validation procedure.

An alternative validation procedure is illustrated in FIG. 13. The procedures of FIG. 13 are the same as the procedures of FIG. 14 in producing the cryptogram on the client side (operation 1305) and the reference cryptogram on the server side (operation 1323). As shown in FIG. 13:

the cryptogram is transformed into the OTP or MAC by a sequence of two transformations, first a transform A (1306) and then a transform B (1307)

the validation server subjects the reference cryptogram to an operation 1325 to produce a modified reference cryptogram, operation 1325 is identical to the operation of transform A, the validation server also subjects the OTP or MAC to an operation (1327) which is the inverse of transform B to produce a modified OTP or MAC, validation depends on a comparison (1328) of the modified OTP or MAC with the modified reference cryptogram.

As was the case for the validation procedure of FIG. 14, the technique of FIG. 13 can be used regardless of whether the cryptogram is produced with a symmetric or asymmetric key.

In contrast to traditional PKI signature verification, the method of FIG. 3 doesn't require the full signature to be available to the server (as was demonstrated in connection with either FIG. 13 or 14). The solution can offer a very high level of security, even if no additional secret codes or keys (provided by the user or stored in the device) are being used other than the private key.

However, the technique of FIG. 3 can only be used if the validating server has a copy of the card's private key when it has to validate an OTP or MAC. The whole point of PKI is exactly that, in order to guarantee true non-repudiation, the private key is never accessible to anyone other than the user associated with that key. In many cases this is guaranteed by the card generating the private and public key pair on-board without any possibility of extracting the private key from the card. In other cases the key pair is generated externally and then injected into the card, but then procedures would normally ensure that the private key in the card personalization system is immediately destroyed after injection into the card and no copy of the private key is allowed to exist outside the card. In other words, this method will in many cases not be a suitable solution.

Figure 5:
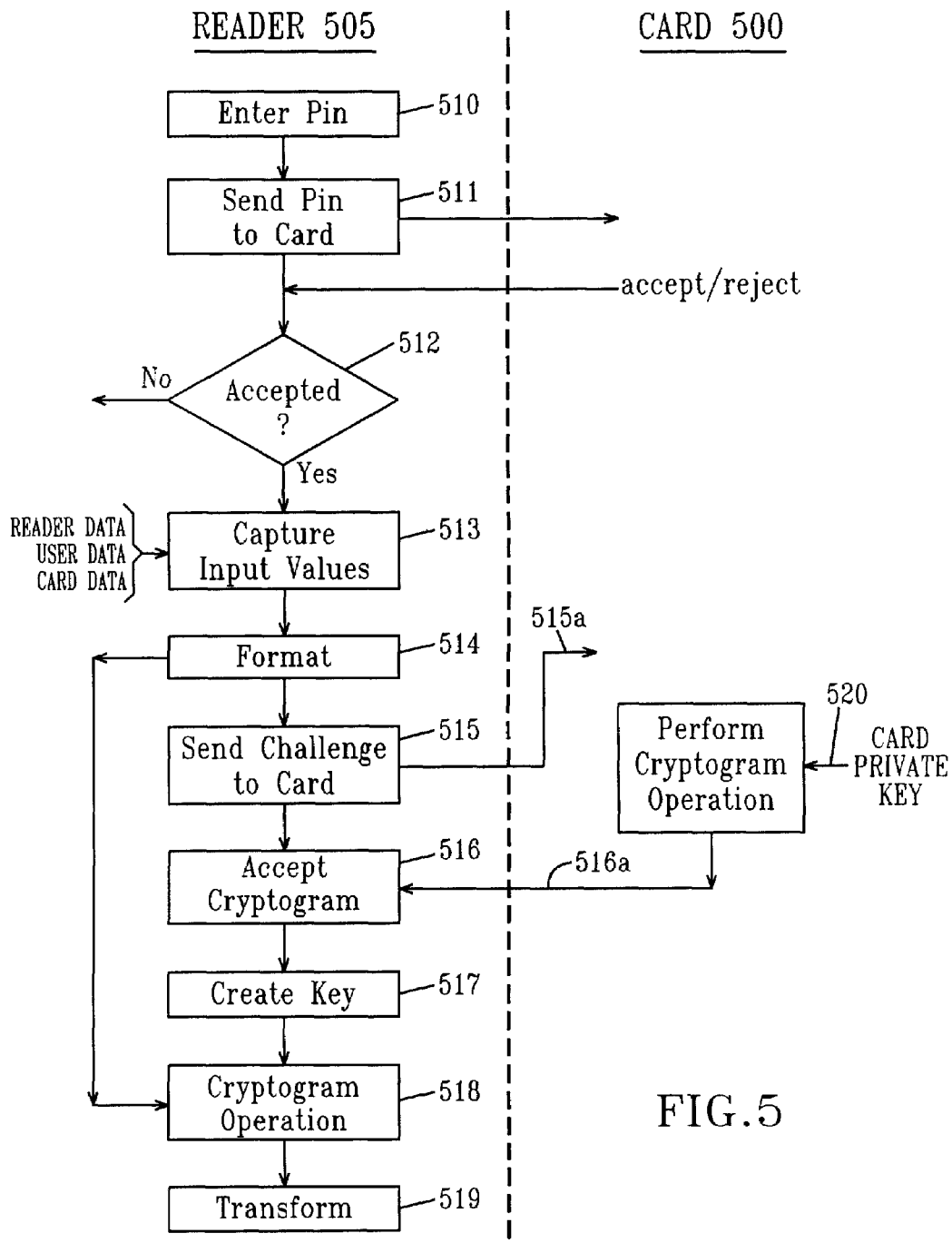
FIG. 5 is the flow diagram of another embodiment of the invention which uses an asymmetric cryptogram as a seed to derive a key which is used in creating a cryptogram representing an OTP or MAC.

Using an Asymmetric Cryptogram as a Seed to Derive a Secret Key (FIG. 5)

In the following embodiment, the requirement that the validation server has access to a copy of the private key at the time of validation is eliminated. In this embodiment an OTP/MAC is generated in the same way as a traditional strong authentication token. All the steps of this algorithm (capturing the inputs, formatting the inputs, encrypting or hashing the formatted inputs, transforming the resulting cryptogram of hash into an OTP/MAC) are performed by the reader 505. In this embodiment the invention differs from conventional practice in how the reader 505 obtains the symmetric secret strong authentication key. To obtain this secret symmetric authentication key, the reader 505 relies on an operation of the card 500 involving the card's private key 520. The main steps of a basic embodiment of this method are as follows:

1. If required (i.e. the card protects usage of the private key by a PIN) the reader asks the user to enter the PIN and submits that PIN to the card.

2. Assuming the card 500 accepts the PIN, the unconnected card reader submits a fixed value to the card to be signed by the private key. This fixed value is further referred to as the 'reader-to-card challenge'.

3. The card signs the given challenge with its private key and returns the resulting cryptogram to the reader. This resulting cryptogram is further referred to as the 'card-to-reader signature response'.

4. The reader uses the resulting cryptogram as a seed to derive a symmetric secret key. This key is further referred to as the 'derived strong authentication secret key'.

The reader dynamically personalizes the strong authentication algorithm (that is entirely carried out by the reader) with that derived strong authentication secret key. In other words the reader carries out the strong authentication token algorithm using the derived strong authentication secret key.

FIG. 5 illustrates a suitable embodiment showing the interaction of reader 505 and card 500. The process may require the user to enter a PIN 510 in order to unlock the card 500. This step is optional, but if performed, the PIN entered at 510 by the user is communicated 511 to the card 500 to be tested. The card either accepts or rejects the PIN. The response of the card 500 is tested, 512 and only if accepted does the process continue. Thereafter function 513 captures input values from some or all of the reader, the user or the card. Function 514 may format some or all of the input values. Some or all of these values, or others, may form a read-to-card challenge 515a which is sent (function 515) to the card 500. The card 500 uses the challenge 515a by performing a cryptographic operation with the card's private key 520. The resulting cryptogram, the card to reader signature response 516a, is communicated back to the reader, function 516. The response 516a is then used as a seed to create a secret value or key 517a via function 517. Key 517a is termed a derived secret strong authentication key. The key 517a is then used in a cryptographic operation, at function 518 along with the formatted value provided by function 514. Finally the resulting cryptogram is transformed at function 519 to produce the OTP or MAC.

The 'reader-to-card challenge' 515*a* could be any of the following:
1. A fixed value that is the same for all readers of a certain batch.
2. A fixed value that is fixed for a given reader but that has a different value for each reader.
3. A fixed value that is constant for a given user but that can be different for different users and that is entered at least once in the reader by the user. In practice it is very likely that this value will be entered either every time the card is used, or only the first time that a given card is used with a certain reader and will then be remembered by the reader.
4. Static data stored on the card that can be read by the reader (e.g. the public key and certificate, or a card serial number).
5. A combination of any of the above.
6. A value derived from any of the above. The derivation optionally including the use of some reader secret.

The algorithm to derive the strong authentication secret key from the 'card-to-reader signature response' could make use of the following techniques (among others):
1. Extracting bits of some data elements
2. Concatenating some parts of some data elements
3. Symmetric encryption/decryption algorithms (e.g. DES, AES, . . . )
4. Hashing algorithms (e.g. SHA-1)

The algorithm to derive the strong authentication secret key 517*a* from the 'card-to-reader signature response' 516*a* could make use of the following extra data elements besides the 'card-to-reader signature response' 516*a*:
1. A fixed value that is the same for all readers of a certain batch.
2. A fixed value that is fixed for a given reader but that has a different value for each reader.
3. A fixed value that is constant for a given user but that can be different for different users and that is entered at least once in the reader by the user.
4. Static data stored on the card that can be read by the reader (e.g. data associated with the private key such as the public key and certificate, or a card serial number).
5. A combination of any of the above.

This description only mentions the use of a single private key of a smart card and a single operation with that key; if the card contains more than one private key the reader could submit the 'reader-to-card challenge' 515*a* to each of these card private keys and combine the resulting 'card-to-reader signature responses' 516*a* in the derivation of the 'derived strong authentication secret key' 517*a*.

Similarly the reader could also submit different 'reader-to-card challenge' values 515*a* to the card and combine the resulting 'card-to-reader signature responses' 516*a* in the derivation of the 'derived strong authentication secret key' 517*a*.

In yet another embodiment the reader does not rely on a single 'reader-to-card challenge' 515*a* and corresponding 'card-to-reader signature response' 516*a* and 'derived strong authentication secret key' 517*a*, but instead uses a set of 'reader-to-card challenges' 515*a* and corresponding 'card-to-reader signature responses' 516*a* and 'derived strong authentication secret keys' 517*a*. To obtain a 'derived strong authentication secret key' 577*a* the reader selects one of these 'reader-to-card 515*a* challenges' and submits it to the card. Which 'reader-to-card challenge' 515*a* is selected determines the corresponding 'card-to-reader signature response' 516*a* and 'derived strong authentication secret key' 517*a*. This selection therefore must happen in a way that is predictable to the validation server. The reader can e.g. cycle through the set of 'reader-to-card challenges' 515*a* in a fixed order or can select a 'reader-to-card challenges' 515*a* depending on the value of the input(s) to the strong authentication token algorithm. A simple example of the latter method is that the strong authentication token algorithm works in challenge-response mode and that one specific digit (e.g. the last digit) of the challenge indicates the index of the 'reader-to-card challenge' to be used.

Because the private key is different for each card, the derived secret key will for a given challenge be specific to a given card. In other words, the secret key that is used in the strong authentication algorithm in the reader is function of the card (or more precisely: the 520 in that card). That means that in principle one needs to have access to the correct card to be able to generate a correct OTP.

In most cases the private key is PIN protected, so that in addition to having access to the correct card, one also needs to know the card's PIN to be able to generate a correct OTP.

If the fixed value which the reader submits to the card to be signed by the private key can be different for different readers, then one needs besides the other elements (e.g. access to the correct card and knowledge of the card's PIN) also the correct reader. Note: such usage of a value that is different for different readers, effectively 'binds' the reader to the card.

For the validation server to be able to validate the strong authentication OTPs and/or MACs generated in this way, it must know the value of the derived strong authentication secret key 517*a*. The server must therefore know the card's signature response 516*a*. The card signature response for a given card challenge is determined by the card's private key 520 and can not be calculated without access to the private key 520. One consequence of this is that the server must have access to the card's private key 520 (directly or indirectly) at least once.

If the key pair is generated internally on the card this means that the server needs access to the card at least once, so that the server can submit to the card the card challenge(s) that will be applicable for this user and retrieve and store the card response(s) to that challenge(s) (indirect access to the private key). If the key pair is generated externally and then injected in the card, the server could use the private key directly to encrypt the challenge(s) before the private key outside the card is destroyed.

Only then is the server able to calculate the corresponding derived strong authentication key from the encrypted card challenge. The disadvantage of this is that, in practice, either the user will have to grant the server access to his/her card during a sort of registration phase, or (in case of external key generation) the server must be allowed to encrypt the challenge with the private key value before that private key value is destroyed.

Another consequence is that in practice for a certain user, the derived strong authentication secret key must remain unchanged. Since the derived strong authentication secret key is derived from the card's signature response to a certain card challenge, that card challenge and the corresponding 'card-to-reader signature response' must remain fixed for a given user. The disadvantage of this is that, if an attacker obtains the value of the 'card-to-reader signature response' of a certain user, then that attacker could potentially make fake cards that always return that recorded 'card-to-reader signature response' value when inserted in a reader.

Including reader specific or user specific data elements in the generation of the 'reader-to-card challenge' and/or the derivation of the 'derived strong authentication secret key' from the 'card-to-reader signature response' can make it harder for an attacker to obtain the value of the correct 'card-to-reader signature response' or to exploit that value with a reader to generate in a fraudulent way correct OTPs or MACs.

Another way to make it harder for an attacker to obtain the correct 'card-to-reader signature response' is to not rely on a single 'reader-to-card challenge' and corresponding 'card-to-reader signature response' and 'derived strong authentication secret key', but instead use a set of 'reader-to-card challenges' and corresponding 'card-to-reader signature responses' and 'derived strong authentication secret keys' as explained above.

In the following embodiment, the requirement for the server to have access at least once to the card to perform a private key operation is eliminated altogether.

In this embodiment, the value of the symmetric secret authentication key is not dependent (directly or indirectly) on the value of the card's private key. The symmetric secret authentication key is not derived from a seed that is generated by the card by means of an asymmetric cryptographic operation involving the card's private key. Instead the reader is personalized with the symmetric secret authentication key or with secret data from which the reader can dynamically derive the symmetric secret authentication key. With this symmetric secret authentication key the reader can generate OTPs or MACs just like a traditional strong authentication token. Usage of the reader is protected and reserved to the legitimate user by logically binding the user's card to the reader. Once the user's card has been bound to the reader, the reader will only generate an OTP or MAC if the user inserts the card that was bound to the reader. The card thus functions as an access key to unlock the personalized reader.

Figure 6:
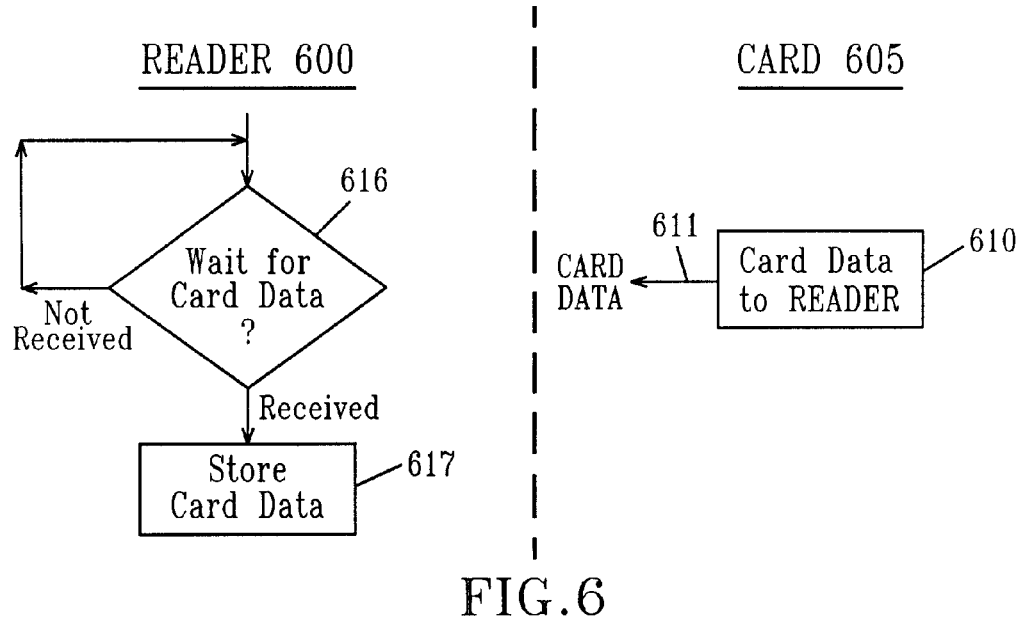
FIGS. 6 and 7 are flow diagrams of still another embodiment of the invention in which the smart card is used to authenticate the user to the reader, which in turn produces a cryptogram from which an OTP or MAC is derived, in this embodiment the user's smart card is bound to the reader in an initial operation (FIG. 6) and operation thereafter is represented in FIG. 7.

At first usage, the reader will request the user's card to be inserted. Upon insertion of the card, the reader binds itself logically to the inserted card in the following way. The reader determines and remembers some specific individual characteristics of that card. These characteristics can include:

card serial number
    card's public key and/or certificate
    the card's response to a given challenge (where the response is defined as the encryption of the challenge by the card's private key. Note: this would typically require the user to submit the PIN to unlock the private key). This challenge and the corresponding card's response must be remembered by the reader. The challenge can be:
        a fixed over-all challenge (same for all cards and all readers)
        fixed challenge per reader
        fixed challenge per card (e.g. randomly generated by the reader upon first presentation of the card and then remembered by the reader)
        challenge provided by user
        a combination of any of the above An example of this operation is illustrated in FIG. 6. The reader 600 awaits receipt of card data (function 616). The card provides some card data 611 to the reader (function 610). When the reader receives the card data 611, that data is stored (function 617).

Figure 7:
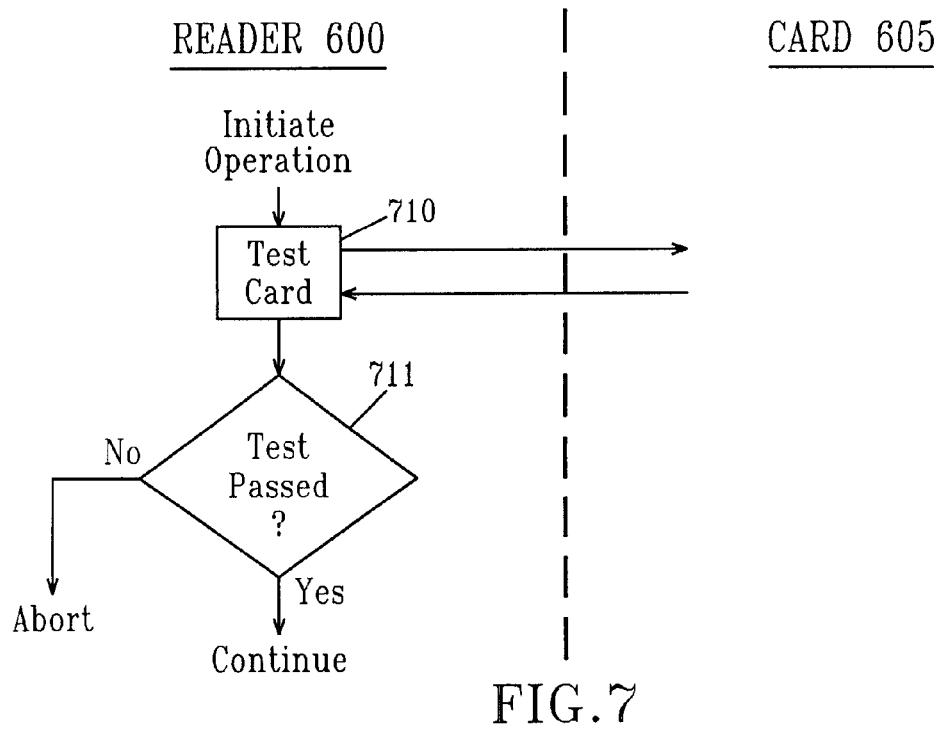

If the user wants to generate a dynamic password or signature (see FIG. 7), the reader asks for the card that was bound to that reader. The reader checks whether the presented card is indeed the expected card. I.e. it will retrieve the characteristics of the presented card (function 710) and compare them with the stored characteristics of the card bound to the reader (function 711). This step can include:

reading the card's serial number
    reading the card's public key and/or certificate
    submitting a (stored) challenge to the card for encryption by the card's private key (which may require the user to provide the PIN to unlock the private key) and receiving the card's response.

Upon successful validation of the presented card, the reader proceeds with performing the strong authentication algorithm as an ordinary strong authentication token.

To strengthen the security, many variations are possible. The reader can derive the symmetric secret authentication key from:

a data element pre-personalized in the reader,
    and/or a data element provided to the reader by the user,
    and/or a data element that the reader reads from the card.

Preferably, these data elements are secret. Instead of using always the same challenge and corresponding card response that was used and obtained when the card was bound to the reader, the reader can use multiple pairs of challenges and corresponding responses. Variations on this principle include:

When the card is bound to the reader, the reader generates and submits more than one challenge to the card and remembers the corresponding card responses. When the reader later on needs to validate the card, it can submit any subset of these challenges to the card and check whether the card's responses match the stored responses.
    When the reader has successfully validated the inserted card, it can generate a new challenge and obtain a corresponding response from the card. This new challenge-response pair can then be remembered by the reader as an alternative or additional pair to the already previously known challenge-response pair(s).

These two variations can be combined.

Figure 8:
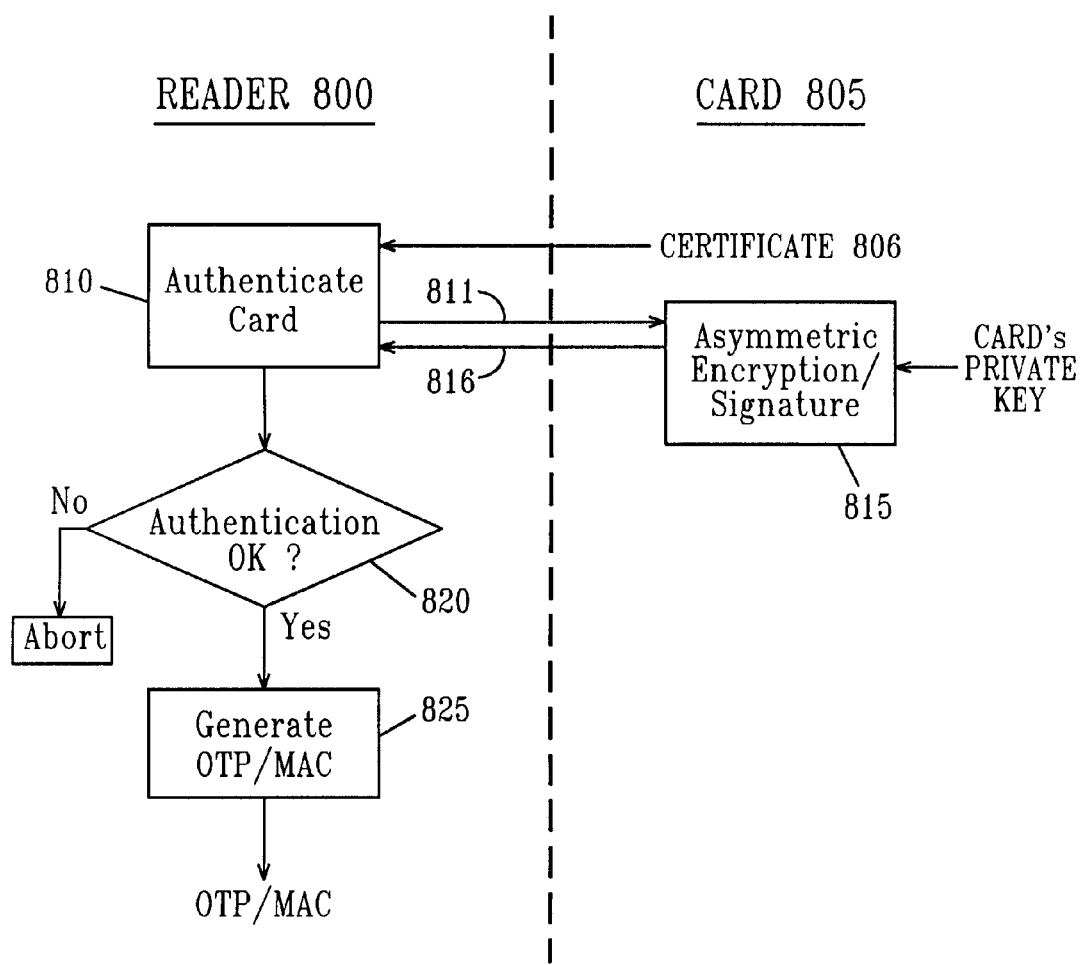
FIGS. 8 and 9 are flow diagrams of still another embodiment of the invention in which the smart card, including a PKI certificate, is used to authenticate the user to the reader, which in turn produces a cryptogram from which an OTP or MAC is derived, in this embodiment a random user may be authenticated.
Figure 9:
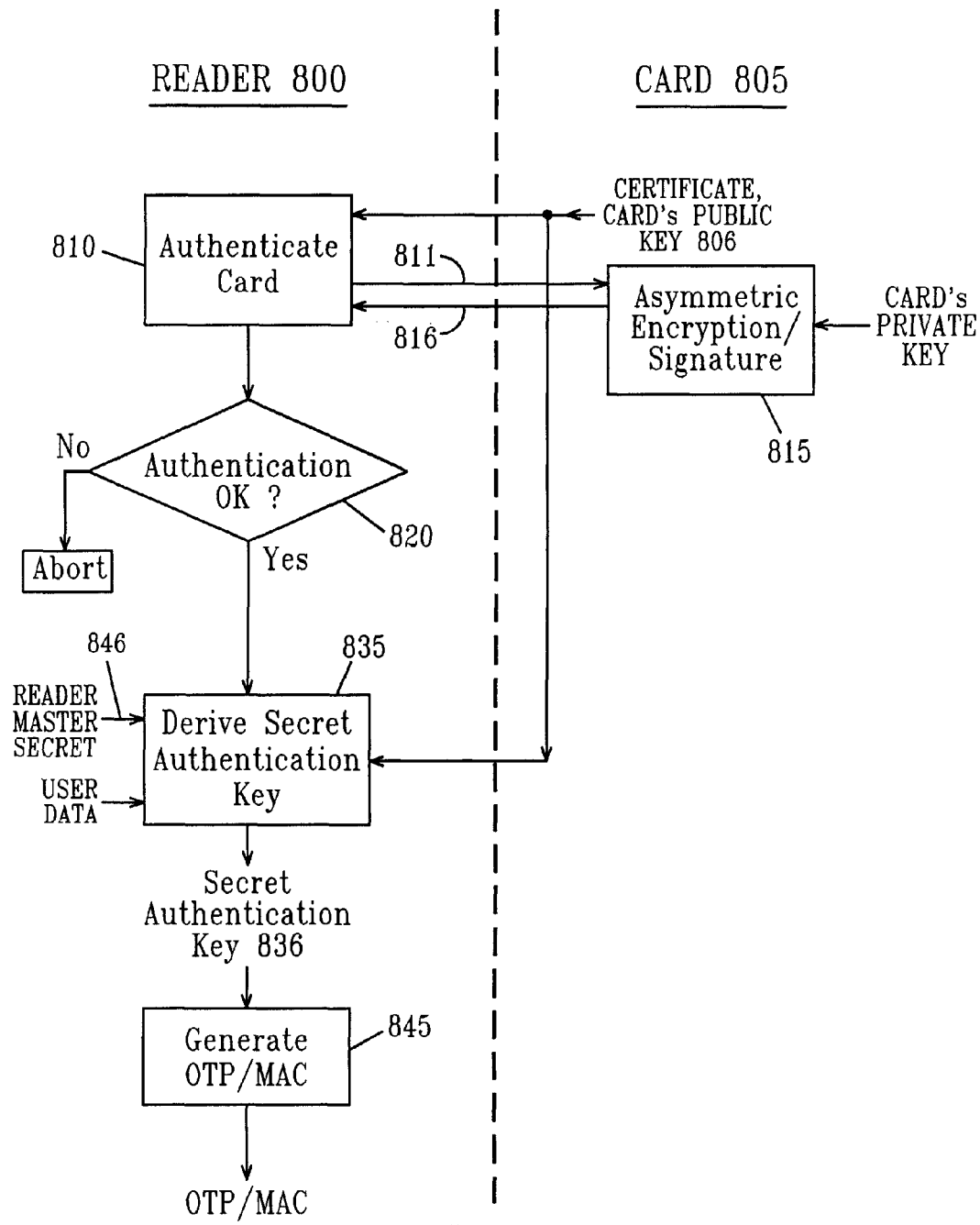

The principle of yet another embodiment (FIGS. 8 and 9) is as follows. On behalf of the server, the reader locally authenticates the user by means of a traditional certificate based authentication of the user's PKI card.

If the user was successfully authenticated by the reader, the reader generates an OTP or MAC (using a traditional strong authentication token algorithm) that can be validated by the validation server. The user can then submit this OTP or MAC to the server as proof that he has been successfully authenticated by the reader.

The reader locally authenticates the user by means of the user's inserted PKI card and using traditional PKI technology. In a typical embodiment this can be done as follows (refer to FIG. 8):

1. The reader 800 validates the card's certificate 806 (or certificate chain).
    a. Note: this assumes that the reader has access to the trusted public key of the (root) Certificate Authority. This can be done by storing the trusted public key of the (root) Certificate Authority in the reader.
    b. Note: the reader 800 does not have to do an explicit verification of the entire certificate (chain) starting from the (root) CA public key each time the card is inserted in the reader. Instead the reader 800 can do the entire verification when a card 805 is inserted for the first time into the reader. The reader can then store the verified certificate or the certificate's public key or a reference value derived from the verified certificate or public key (e.g. a hash of the certificate or public key). If the card 805 is then re-inserted at a later time, the reader 800 no longer has to do all the calculations associated with certificate validation, but can just compare the certificate on the card with the certificate or reference value stored in the reader.

2. The reader 800 does a challenge-response authentication of card's private key:
   a. Reader (810) generates a challenge 811, e.g. typically a random number or some other non-predictable value that is e.g. derived from a time value or counter value with a cryptographic algorithm using some secret stored in the reader.
   b. The user provides the PIN protecting the card's private key.
   c. The reader 800 submits the PIN to the card.
   d. The reader 800 submits a random challenge 811 to card to be encrypted by card's private key.
   e. The card signs (815) the reader challenge with its private key and returns response (=encrypted challenge 816).
   f. The reader 800 decrypts card's response with card's public key (from the certificate).
   g. The reader compares 820 decrypted card's response with originally generated challenge. If the decrypted card's response is the same as the originally generated challenge, then the card's private key is authenticated and hence the user is authenticated.

In essence the reader generates (825) an OTP/MAC in the same way as a traditional strong authentication algorithm. All the steps of this algorithm (capturing the inputs, formatting the inputs, encrypting or hashing the formatted inputs, transforming the resulting cryptogram of hash into an OTP/MAC) are done by the reader 800 in essentially the same way as a traditional strong authentication token. In one embodiment the reader is personalized with a symmetric secret strong authentication key. In that case the reader 800 is also typically configured to expect a specific card. The reader recognizes this card by means of some characteristic value of a data element of the card. Typically the card's certificate is used as such a data element. In other embodiments(see FIG. 9), in order to avoid having to personalize and configure the readers, the reader 800 derives (835) a card-specific value for the symmetric secret strong authentication key from the following data elements:
   public card data preferably related to the card's certificate or public key (e.g. card serial number, certificate serial number, public key, etc.)
   a master key 846 stored in the reader and known to the server. This master key can be:
      an identical value for all readers
      a specific/unique value for each individual reader. This requires some kind of assignment of the reader to the user, and registration of this assignment at the server.
   an (optional) extra derivation data element could be a (secret) data element that is provided to the reader by the user. The user must explicitly provide this data element:
      either, each time the reader and card are used in this way
      or,
      only when this card is used for the first time with this reader (after which the reader will remember the provided value of the data element for this card)

The reader 800 uses the derived card-specific symmetric authentication key 836 in a symmetric strong authentication algorithm (such as the Digipass algorithm or OATH) to generate (845) a dynamic password (challenge-response and/or time and/or event based) or generate (845) a MAC-type of electronic signature on some transaction data (optionally including time and/or event counter information).

A Server validates the generated dynamic password or signature as follows:
   The server derives the same card-specific symmetric strong authentication key as the reader. This assumes that the server has a database (or an alternative way of retrieving the required information) that links the user to:
      the public card data,
      the data element provided by the user (if applicable) and the reader's master key
         Note: instead of doing this derivation each time a validation must be done, the derivation can also be done once and the resulting derived key can be stored in a database for future use.
   The server validates the dynamic password or signature in the same way as it would do for a traditional strong authentication token.

Figure 10:
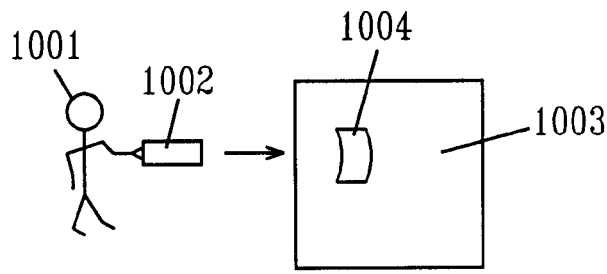
FIGS. 10 and 11 illustrate actions taken in an initial session to capture information allowing operation of various embodiments of the invention.
Figure 11:
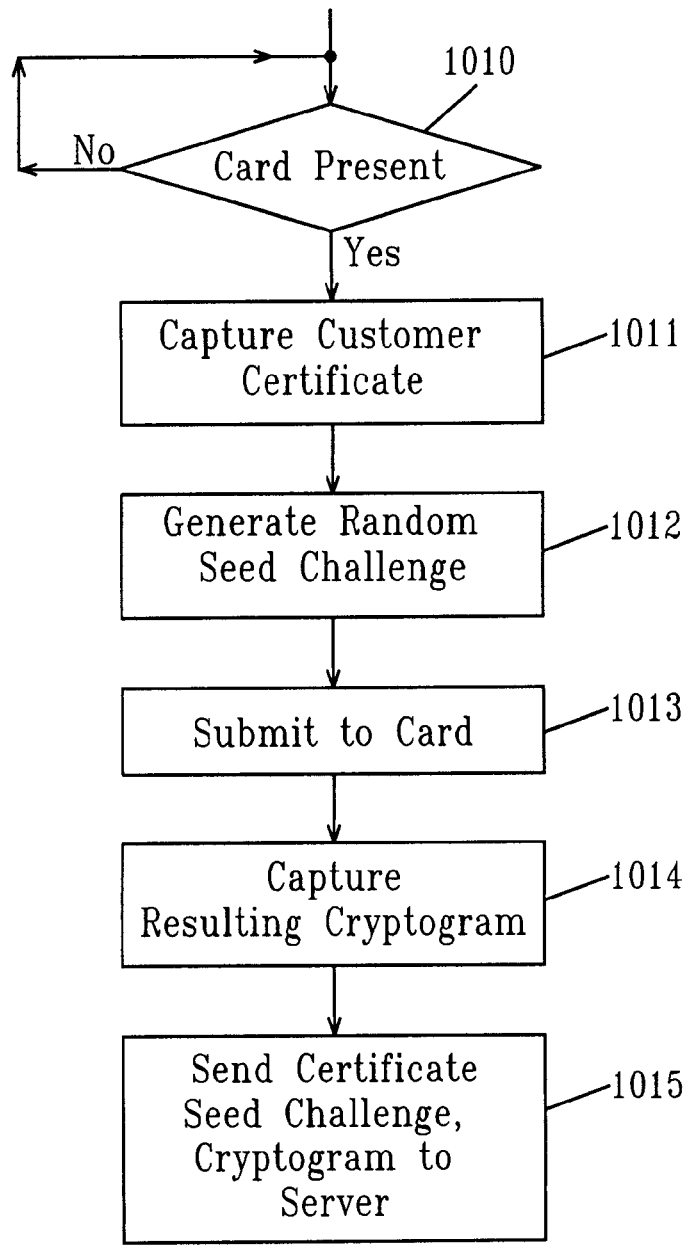

A typical embodiment operates as follows (FIGS. 10-11):
In an enlistment phase, a bank customer 1001 goes to a bank branch 1003. Using his national electronic identity card (e-id card 1002) with a Bank Branch Terminal (BBT), the customer electronically signs an e-banking contract 1004.

While the customer's e-id card is inserted in the BBT (1010), the BBT:
   captures the customer's certificate (1011),
   generates a random seed challenge (1012),
   submits the random seed challenge to the e-id card (1002) to be encrypted by the card's private key (1013),
   captures the card's cryptogram on that challenge (1014).

Finally, the BBT sends the customer's certificate, generated seed challenge, and the card's cryptogram on the seed challenge to a server (1015). The server stores this data in a database linked to the customer. The bank then delivers an unconnected smart card reader to the customer. This reader contains a secret master key. The bank also sends the customer a PIN mailer with the value of the seed challenge that was generated and used by the BBT. The authentication server is also informed of the value of the secret master key.

When the customer uses the reader for the first time:
   The reader asks for the customer's e-id card to be inserted.
   The reader also asks for the PIN mailer's seed challenge and stores it in memory.
   The reader reads the card's certificate and stores it also in memory.
   The reader generates a random reader challenge and submits it to the card to be encrypted by the card's private key. The reader stores both the reader challenge and the corresponding cryptogram generated by the card.

If the customer wants to generate an OTP (or MAC or response or . . . ) the reader goes through the following steps:
   The reader asks for the customer's e-id card to be inserted.
   The reader validates the card:
      The reader reads the card's certificate and compares it to the certificate that was stored.
      If that checks OK, the reader submits the stored reader challenge to the card for signature and compares the card's cryptogram with the stored cryptogram.
   If the reader has successfully validated the card, the reader generates the secret authentication key:
      The reader submits the stored PIN mailer seed challenge to the card to be encrypted by the card.
      The reader now derives a secret authentication key from:
         the secret master key in the reader,
         the PIN mailer seed challenge,
         the card's cryptogram on that PIN mailer seed challenge,
         the card's certificate.
   The reader now uses the generated secret authentication key in a strong authentication algorithm (e.g. to generate an OTP or a MAC).

The authentication server is capable of verifying the resulting OTP (or MAC) since it had access to all the data necessary to generate the secret authentication key:
- the reader's secret master key,
- the card's certificate,
- the PIN mailer challenge,
- the card's cryptogram on the PIN mailer challenge.

Using the generated secret authentication key, the authentication server can validate the OTPs or MACs in the same way it would validate OTPs or MACs generated by traditional strong authentication tokens.

Alternatively the authentication server can use either of the procedures shown in FIG. 13 or 14 for a validation operation.

In connection with the procedure of FIG. 13, we assume that the cryptogram produced by the reader is transformed using a sequence of transform A (1306) and transform B (1307). For validation purposes the server subjects the OTP or MAC to the reverse transform B (1327) to produce a modified OTP or MAC and then subjects the reference cryptogram to transform A (1325) to produce the modified reference cryptogram. Finally the server effects a comparison of the modified reference cryptogram and the modified OTP or MAC.

In connection with the procedure of FIG. 14, we assume that the cryptogram produced by the reader is transformed using a sequence of the bit selection (1355), concatenation (1356) and bit string transformation (1357) as shown in FIG. 14 to produce the OTP or MAC. For validation purposes the server subjects the OTP or MAC to the bit stream and expansion processes 1359 and 1360 of FIG. 14 to produce a modified OTP or MAC. The server subjects the reference cryptogram to operation 1364 to produce the modified reference cryptogram. Finally the server effects a comparison (1365) of the modified reference cryptogram and the modified OTP or MAC to effect validation.

The foregoing has described several aspects or embodiments comprising methods or devices. In another aspect the invention comprises a sequence of instructions recorded on a computer readable medium which, when executed by a processor perform methods as already described. Software delivery can also be effected over digital networks such as the Internet. Accordingly in still a further aspect the invention comprehends an information bearing signal which comprises a sequence of instructions which, when executed by a processor perform methods as already described.

While several embodiments of the invention have been described with some particularity it should be understood that this description is exemplary and not limiting; the scope of the invention is to be determined by the claims appended hereto.

What is claimed is:

1. A method to generate a security value comprising a One-Time Password (OTP) or a Message Authentication Code signature (MAC) comprising:
    obtaining an intermediate dynamic value created using one or more variable inputs and a symmetric cryptographic operation which employs at least one secret;
    transforming said dynamic value into said security value, wherein an asymmetric cryptographic operation with a private key of a public-private key pair is carried out producing a cryptogram, in order to enable said obtaining or said transforming, and
    said transforming includes producing said security value of a size which is smaller than the size of a cryptogram that was generated by said asymmetric cryptographic operation.

2. A method of validating a security value provided by a user in order to authenticate the user or data associated with the user, said security value comprising a One Time Password or a signature comprising a Message Authentication Code and generated using the method of claim 1; said method comprising:
    creating a reference cryptogram using a reference cryptographic algorithm applied to one or more reference inputs using a server-side key or secret value, the server-side key or secret value and the reference cryptographic algorithm and the one or more reference inputs selected as identical to corresponding elements used in creating the security value by the authentic user, and
    operating on said reference cryptogram by transforming said reference cryptogram into a reference security value including producing said reference security value of a size which is smaller than the size of said cryptogram that has been generated by said asymmetric cryptographic operation, and
    operating on said security value to produce a modified security value, and
    effecting a comparison of said reference security value and said modified security value, and
    determining validity of said security value from results of said comparison.

3. The method of claim 2 wherein:
    said operation on said reference cryptogram is identical, in part to an operation carried out to create said security value.

4. The method of claim 1 where said one or more variable inputs include one or more of:
    a time value;
    a counter value;
    a challenge value;
    transaction data; or
    any combination of the foregoing.

5. The method of claim 4 where creating said intermediate dynamic value includes using one or more of:
    data identifying a device generating said security value; or
    a secret or secrets stored in the device generating said security value; or
    data identifying a user of the device generating said security value; or
    data associated with said private key; or
    a secret provided by the user of the device generating said security value.

6. The method of claim 5 further comprising:
    using a first device to capture values of said one or more variable inputs and to present said security value,
    using a second device to store said private key and perform said asymmetric cryptographic operation, where
    said second device receives information from the first device and sends information to said first device, and
    said first device sends information to the second device and receives information from the second device.

7. The method of claim 6 wherein:
    said first device is a battery-powered smart card reader with a keypad and display.

8. The method of claim 4 wherein:
    said security value is dependent on the value of said private key.

9. The method of claim 8 wherein:
    said security value is a function of the value of said cryptogram generated by said asymmetric cryptographic operation with said private key.

10. The method of claim 9 wherein
    a secret or key used in said symmetric cryptographic operation is derived from said cryptogram generated by said asymmetric cryptographic operation with said private key.

11. The method of claim 4 wherein:
said transformation of said dynamic value into said security value includes one or more of:
   hashing;
   encrypting or decrypting with a symmetric cryptographic algorithm;
   truncating;
   selection of certain bits, nibbles or bytes; or
   decimalization.

12. The method of claim 4 further comprising:
using a first device to capture values of said one or more variable inputs, to perform said obtaining or said transforming, and to present said security value,
using a second device to store said private key and perform said asymmetric cryptographic operation, where
said second device receives information from the first device and sends information to said first device, and
said first device sends information to the second device and receives information from the second device.

13. The method of claim 12 wherein:
said first device is a battery-powered smart card reader with a keypad and display.

14. The method of claim 12 wherein:
said second device is a smart card.

15. The method of claim 12 wherein:
said second device is a USB stick.

16. The method of claim 12 wherein:
said first device is a PC or a PDA or a Mobile Phone.

17. The method of claim 12 wherein:
said first device submits a first device challenge to said second device;
said second device performs an asymmetric cryptographic operation on said first device challenge with said private key and returns a resulting cryptogram to said first device;
said first device verifies said resulting cryptogram; and
said first device generates said security value on condition that said verification of said resulting cryptogram is successful.

18. The method of claim 17 wherein:
data for said symmetric cryptographic operation is derived from said one or more variable inputs; and
said intermediate dynamic value is derived from the output of said symmetric cryptographic operation.

19. The method of claim 17 wherein:
said symmetric cryptographic operation uses a symmetric secret that is derived from one or more of the following:
   data identifying said first device;
   a secret or secrets stored in said first device;
   at a associated with said private key;
   data stored on said second device;
   data identifying a user of said first device; or
   a secret provided by the user of the said first device.

20. The method of claim 17 wherein a first device challenge is submitted at least twice to said second device producing an initial cryptogram on said initial presentation and a later cryptogram on a second presentation: and said method further includes:
   deriving a reference value from said initial cryptogram;
   storing in said first device said reference value; and
   verifying said later cryptogram by comparing said later cryptogram with said stored reference value.

21. The method of claim 17 further including:
maintaining in storage in said first device at least one first device challenge along with at least one corresponding verification value; and
wherein said verification of said resulting cryptogram includes comparing said resulting cryptogram with said corresponding verification value.

22. The method of claim 17 further including:
performing during an initial usage of said first device with said second device, a sequence comprising:
   generating said at least one challenge;
   submitting said at least one challenge to said second device for an asymmetric cryptographic operation by said second device using said private key;
   receiving from said second device at least one resulting cryptogram;
   deriving from said at least one resulting cryptogram a verification value; and
   storing said at least one challenge along with said at least one verification value.

23. The method of claim 22 wherein said first device, from time to time executes a sequence comprising:
   generating a new device challenge;
   submitting said new device challenge to said second device for an asymmetric cryptographic operation by said second device using said private key;
   receiving from said second device a corresponding new cryptogram;
   deriving from said corresponding new cryptogram a new verification value; and
   storing in memory said new device challenge along with said new verification value.

24. The method of claim 23 wherein:
said new device challenge and said new verification value replace an earlier device challenge and verification value.

25. The method of claim 24 wherein said sequence is executed on each occasion said verification is successful.

26. The method of claim 17 wherein:
said verification by said first device of said resulting cryptogram requires use of a public key corresponding to said private key of said second device.

27. The method of claim 26 wherein:
said first device verifies a certificate or certificate chain that corresponds to said public key.

28. The method of claim 27 wherein:
said first device maintains in memory a public key of a certificate authority;
said verification by said first device of said a certificate or certificate chain requires use of said public key of said certificate authority.

29. Apparatus generating a security value comprising a One-Time Password (OTP) or a Message Authentication Code signature (MAC) using the method of claim 4.

30. The apparatus of claim 29 which includes:
a reader for:
   conveying an input to said asymmetric cryptographic operation, and
   receiving the resulting asymmetric cryptogram of said asymmetric cryptographic operation, and which also includes
a processing unit for:
   deriving a secret value or a symmetric key from said resulting asymmetric cryptogram to produce a derived secret value or symmetric key, and
   obtaining said dynamic value using said derived secret value or said derived symmetric key with a symmetric cryptographic algorithm.

31. The apparatus of claim 29 which includes:
a reader for:
conveying a reader challenge to said asymmetric cryptographic operation, and
receiving the resulting asymmetric cryptogram of said asymmetric cryptographic operation; and which also includes
a memory for storing a reference value; and which also includes
a processing unit for:
verifying said resulting asymmetric cryptogram by comparing said resulting asymmetric cryptogram with said stored reference value, and
generating said security value on condition that said verification of said resulting asymmetric cryptogram is successful.

32. The apparatus of any of claims 29, 30 and 31 which further includes a battery supply, a keypad and a display.

33. The apparatus of claim 32 which further includes a smart card performing said asymmetric cryptographic operation.

34. The apparatus of claim 29 which includes:
a reader for:
conveying a reader challenge to said asymmetric cryptographic operation, and
receiving the resulting asymmetric cryptogram of said asymmetric cryptographic operation; and which also includes
a processing unit for:
verifying said resulting asymmetric cryptogram by using a public key corresponding to said private key and by verifying a certificate or certificate chain that corresponds to said public key,
generating said security value on condition that said verification of said resulting asymmetric cryptogram is successful.

35. The apparatus of claim 34 which also includes a memory for:
storing a public key of a certificate authority that is used to verify said certificate or certificate chain that corresponds to said public key.

36. A method of validating a security value provided by a user in order to authenticate the user or data associated with the user, said security value comprising a One Time Password or a signature comprising a Message Authentication Code; said method comprising:
creating a reference cryptogram using a reference cryptographic algorithm applied to one or more reference inputs using a server key or a secret value which is a function of the value of a PKI private key of an authentic user, the reference cryptographic algorithm and the one or more reference inputs selected as identical to corresponding elements used in creating the security value by the authentic user;
thereafter either
operating on said reference cryptogram alone by transforming said reference cryptogram into a reference security value including producing said reference security value of a size which is smaller than the size of the reference cryptogram and effecting a comparison of said reference security value and said security value, or
operating on both said reference cryptogram and said security value to produce a modified reference cryptogram and a modified security value, and effecting a comparison of said modified reference cryptogram and said modified security value, and
determining validity of said security value from results of said comparison.

37. The method of claim 36 wherein:
said operation on said reference cryptogram to produce said modified reference cryptogram is identical, in part to an operation carried out to create said security value.

38. The method of claim 36 wherein said reference cryptographic algorithm is an asymmetric algorithm and said server key has the same value as the PKI private key of the authentic user.

39. The method of claim 36 wherein said reference cryptographic algorithm is a symmetric algorithm and said server key or a secret value is derived from a cryptogram generated with a PKI private key of the authentic user.

40. A computer readable medium supporting a sequence of instructions which, when executed perform a method of generating a security value comprising a One-Time Password (OTP) or a Message Authentication Code signature (MAC), said method comprising:
obtaining an intermediate dynamic value created using one or more variable inputs and a cryptographic algorithm employing at least one secret;
transforming said dynamic value into said security value,
wherein an asymmetric cryptographic operation with a private key is carried out producing a cryptogram, in order to enable said obtaining or said transforming, and
said transforming includes producing said security value of a size which is smaller than the size of a cryptogram that was generated by said asymmetric cryptographic operation.

41. The computer readable medium of claim 40 where said one or more variable inputs include one or more of:
a time value;
a counter value;
a challenge value;
transaction data; or
any combination of the foregoing.

42. The computer readable medium of claim 41 where creating said intermediate dynamic value includes using one or more of:
data identifying a device generating said security value; or
a secret or secrets stored in the device generating said security value; or
data identifying a user of the device generating said security value; or
data associated with said private key; or
a secret provided by the user of the device generating said security value.

43. The computer readable medium of claim 41 wherein:
said transformation of said dynamic value into said security value includes one or more of:
hashing;
encrypting or decrypting with a symmetric cryptographic algorithm;
truncating;
selection of certain bits, nibbles or bytes; or
decimalization.

44. An information bearing signal comprising a sequence of instructions which, when executed in a processor perform a method of generating a security value comprising a One-Time Password (OTP) or a Message Authentication Code signature (MAC), said method comprising:
obtaining an intermediate dynamic value created using one or more variable inputs and a cryptographic algorithm employing at least one secret;
transforming said dynamic value into said security value, wherein an asymmetric cryptographic operation with a private key is carried out producing a cryptogram, in order to enable said obtaining or said transforming, and said transforming includes producing said security value of a size which is smaller than the size of a cryptogram that was generated by said asymmetric cryptographic operation.

45. The information bearing signal of claim 44 where said one or more variable inputs include one or more of:
a time value;
a counter value;
a challenge value;
transaction data; or
any combination of the foregoing.

46. The information bearing signal of claim 45 where creating said intermediate dynamic value includes using one or more of:
data identifying a device generating said security value; or
a secret or secrets stored in the device generating said security value; or
data identifying a user of the device generating said security value; or
data associated with said private key; or
a secret provided by the user of the device generating said security value.

47. The information bearing signal of claim 45 wherein:
said transformation of said dynamic value into said security value includes one or more of:
hashing;
encrypting or decrypting with a symmetric cryptographic algorithm;
truncating;
selection of certain bits, nibbles or bytes; or
decimalization.

48. A method of authenticating a plurality of users whereby each user has at least one associated smart card; said smart cards containing at least one PKI private key and capable of performing asymmetric cryptographic operations with said PKI private key; said method comprising the steps of:
generating a server-side key or secret value for each smart card associated with a user, and
receiving from said users security values comprising OTPS or MACs, and
authenticating said users by validating said received security values according to the method of claim 2 using said server-side key or secret value.

49. The method of claim 48, including the steps of:
for each user, submitting a challenge to said smart card associated with said user for an asymmetric cryptographic operation with said private key on said smart card, and
receiving from said smart card the resulting cryptogram on said smart card, and
using said resulting cryptogram by said private key on said smart card in said generation of said server-side key or secret value.

50. The method of claim 48, including the steps of:
generating one or more secret key derivation seeds, and
using at least one of said secret key derivation seeds in said generation of said server-side key, and
communicating to said users the said at least one of said secret key derivation seeds that were used in said generation of said server-side keys for the said smart cards associated with these users.

51. The method of claim 48, including the steps of:
obtaining data from a certificate stored on said smart card associated with each of said users, and
using said data from said certificate in said generation of said server-side key.

52. A method to generate a security value comprising a One-Time Password (OTP) or a Message Authentication Code signature (MAC) comprising:
obtaining an intermediate dynamic value created using one or more variable inputs and a cryptographic algorithm which employs at least one secret;
transforming said dynamic value into said security value,
wherein an asymmetric cryptographic operation with a private key of a public-private key pair is carried out producing a cryptogram, in order to enable said obtaining or said transforming, and
said transforming includes producing said security value of a size which is smaller than the size of a cryptogram that was generated by said asymmetric cryptographic operation.

53. The method of claim 52 where said one or more variable inputs include one or more of:
a time value;
a counter value;
a challenge value;
transaction data; or
any combination of the foregoing.

54. The method of claim 53 wherein:
said security value is dependent on the value of said private key.

55. The method of claim 54 wherein:
said security value is a function of the value of said cryptogram generated by said asymmetric cryptographic operation with said private key.

56. The method of claim 55 wherein
a value calculated from at least one of said one or more variable inputs is used as an input to said asymmetric cryptographic operation, and
said intermediate dynamic value is a function of the resulting cryptogram produced by said asymmetric cryptographic operation.

57. Apparatus generating a security value comprising a One-Time Password (OTP) or a Message Authentication Code signature (MAC) using the method of claim 53.

58. The apparatus of claim 57 which includes:
a reader for:
conveying an input to said asymmetric cryptographic operation, and
receiving the resulting asymmetric cryptogram of said asymmetric cryptographic operation, and which also includes
a processing unit for:
generating said input for said asymmetric cryptographic operation based on said one or more variable inputs, and
deriving said intermediate dynamic value from said resulting cryptogram.

* * * * *